United States Patent
Kim et al.

(10) Patent No.: US 9,909,894 B2
(45) Date of Patent: Mar. 6, 2018

(54) COMPONENTIZED JUNCTION MODELS

(71) Applicant: HERE Global B.V., Veldhoven (NL)

(72) Inventors: Robin Kim, Naperville, IL (US); Michael Limber, San Marcos, CA (US); Jeff Bach, Aurora, IL (US)

(73) Assignee: HERE Global B.V., Eindhoven (NL)

( * ) Notice: Subject to any disclaimer, the term of this patent is extended or adjusted under 35 U.S.C. 154(b) by 0 days.

(21) Appl. No.: 14/990,301

(22) Filed: Jan. 7, 2016

(65) Prior Publication Data
US 2017/0199051 A1    Jul. 13, 2017

(51) Int. Cl.
*G01C 21/36* (2006.01)

(52) U.S. Cl.
CPC ..... *G01C 21/3635* (2013.01); *G01C 21/3658* (2013.01)

(58) Field of Classification Search
CPC ............ G01C 21/3635; G01C 21/3658; G01C 21/3667
See application file for complete search history.

(56) References Cited

U.S. PATENT DOCUMENTS

| | | | |
|---|---|---|---|
| 4,907,160 A | 3/1990 | Duncan et al. | |
| 5,902,350 A | 5/1999 | Tamai et al. | |
| 5,910,177 A | 6/1999 | Zuber | |
| 5,928,308 A | 7/1999 | Nanba et al. | |
| 6,018,697 A | 1/2000 | Morimoto et al. | |
| 6,134,501 A | 10/2000 | Oumi | |
| 6,188,957 B1 | 2/2001 | Bechtolsheim et al. | |
| 6,249,740 B1 | 6/2001 | Ito et al. | |
| 6,269,305 B1 | 7/2001 | Yamashita et al. | |
| 6,278,943 B1 | 8/2001 | Yamauchi | |
| 6,292,752 B1 | 9/2001 | Franke et al. | |
| 6,385,536 B2 | 5/2002 | Kimura | |
| 6,405,128 B1 | 6/2002 | Bechtolsheim et al. | |
| 6,405,131 B1 | 6/2002 | Barton | |

(Continued)

FOREIGN PATENT DOCUMENTS

| EP | 1096229 | 5/2001 |
|---|---|---|
| EP | 1111336 | 6/2001 |

(Continued)

OTHER PUBLICATIONS

Dal-Poz et al., Automatic Extraction of Road Seeds from High-Resolution Aerial Images, Jan. 5, 2005, Annals of the Brazilian Academy of Sciences.

(Continued)

*Primary Examiner* — Mussa A Shaawat
*Assistant Examiner* — Michael Kerrigan
(74) *Attorney, Agent, or Firm* — Lempia Summerfield Katz LLC

(57) ABSTRACT

In one embodiment, a method is provided for componentized junction models. A plurality of road junction configurations are defined with a different set of road segment models corresponding to each of the plurality of road junction configurations. One of the plurality of road junction configurations are selected for a route through a physical road junction. A model of the physical road junction is generated by assembling the set of road segment models corresponding to the selected road junction configuration. The three-dimensional model of the physical road junction is rendered.

20 Claims, 31 Drawing Sheets

(56) References Cited

U.S. PATENT DOCUMENTS

| | | |
|---|---|---|
| 6,446,000 B2 | 9/2002 | Shimabara |
| 6,505,117 B1 | 1/2003 | Ratert et al. |
| 6,510,382 B2 | 1/2003 | Wilson |
| 6,526,348 B1 | 2/2003 | McDonough |
| 6,539,300 B2 | 3/2003 | Myr |
| 6,587,781 B2 | 7/2003 | Feldman et al. |
| 6,597,354 B2 | 7/2003 | Sakamoto et al. |
| 6,624,782 B2 | 9/2003 | Jocoy et al. |
| 6,720,920 B2 | 4/2004 | Breed et al. |
| 6,819,779 B1 | 11/2004 | Nichani |
| 7,383,126 B2 | 6/2008 | Takahashi |
| 7,502,685 B2 | 3/2009 | Nakamura |
| 7,630,832 B2 | 12/2009 | Kim et al. |
| 7,783,422 B2 | 8/2010 | Tanaka |
| 8,068,982 B2 | 11/2011 | Takada |
| 8,134,480 B2 | 3/2012 | Onome et al. |
| 8,195,386 B2 | 6/2012 | Hu et al. |
| 8,630,801 B2 | 1/2014 | Katzer |
| 8,983,778 B2 | 3/2015 | McCarthy |
| 9,046,380 B2 | 6/2015 | Mori et al. |
| 2001/0056326 A1 | 12/2001 | Kimura |
| 2002/0013659 A1 | 1/2002 | Kusama |
| 2002/0014979 A1 | 2/2002 | Wilson |
| 2002/0018004 A1 | 2/2002 | Raswant |
| 2002/0036584 A1 | 3/2002 | Jocoy et al. |
| 2002/0103622 A1 | 8/2002 | Burge |
| 2002/0198694 A1 | 12/2002 | Yang et al. |
| 2003/0074131 A1 | 4/2003 | Barkowski et al. |
| 2003/0187578 A1 | 10/2003 | Nishira et al. |
| 2004/0030670 A1 | 2/2004 | Barton |
| 2004/0236543 A1 | 11/2004 | Stephens |
| 2007/0080961 A1 | 4/2007 | Inzinga et al. |
| 2011/0285717 A1* | 11/2011 | Schmidt ............ G01C 21/3632 345/441 |
| 2012/0143504 A1 | 6/2012 | Kalai et al. |
| 2013/0328863 A1 | 12/2013 | Pirwani |
| 2014/0362082 A1 | 12/2014 | Schpok et al. |

FOREIGN PATENT DOCUMENTS

| | | |
|---|---|---|
| EP | 1544577 A1 | 6/2005 |
| EP | 2192554 A1 | 6/2010 |
| EP | 2359095 A1 | 8/2011 |
| WO | WO9957516 | 11/1999 |

OTHER PUBLICATIONS

European Search Report cited in EP03257191.1, dated Jun. 21, 2007.

Fohl et al., A Non-Planar, Lane-Based Navigable Data Model for ITS, Aug. 1996, pp. 7B17-7B29, National Center for Geographic Infromation and Analysis.

Rogers, et al., Mining GPS Data to Augment Road Models, NEC Research Index, Web Page, 1999, 21 pages, citeseer.nj.nec.com.

U.S. Appl. No. 09/918,668, filed Jul. 31, 2002.

U.S. Appl. No. 14/500,551, filed Sep. 24, 2014.

PCT International Search Report and Written Opinion of the International Searching Authority dated Apr. 20, 2017 for corresponding PCT/EP2017/050284.

* cited by examiner

10A

10B

10C

10D

Junction Definition Key junction configuration — destination link lane counts originating link lane counts — conditional overpass/underpass lane count

Core Map Coding with Lane Traversals

*Note: The path beyond the cloverleaf exit is mostly abstracted. Lane Traversals in that region that are not shown are ignored.*

Junction Definition Key

Core Map Coding with Lane Traversals

*Note: The path between the two decision points is partially abstracted. Lane Traversals in that region that are not shown are ignored.*

COMPONENTIZED JUNCTION MODELS

FIELD

The following disclosure relates to turn-by-turn navigation applications, and more particularly to providing turn-by-turn navigation for road junctions.

BACKGROUND

Map data and other geographic data are used by computer based systems to provide useful features to users. For example, computer based systems may identify routes to destinations or other points of interest. A navigation system may determine the optimum route to be taken by the end user to travel from an origin to a destination location from map data stored in a map database. Similarly, the navigation system may query the map data for nearby points of interest, or provide other map-related functions. The navigation system may provide a map view images and instructions to the user based on the queried map database and map data. The images may include road intersections or junctions. However, the intersections or junctions provided by the navigation system may not accurately match real world intersections or junctions.

SUMMARY

In one embodiment, a method is provided for componentized junction models. A plurality of road junction configurations are defined with a different set of road segment models corresponding to each of the plurality of road junction configurations. One of the plurality of road junction configurations are selected for a route through a physical road junction. A model of the physical road junction is generated by assembling the set of road segment models corresponding to the selected road junction configuration. The three-dimensional model of the physical road junction is rendered.

In another embodiment, an apparatus for componentized junction models is provided including at least one processor and at least one memory including computer program code for one or more programs. The memory and computer program code is configured to, with the at least one processor, cause the apparatus to receive a plurality of road junction configurations. Each of the plurality of road junction configurations correspond to a set of road segment models. The memory and computer program code is further configured to select one of the plurality of road junction configurations for a route through a physical road junction, to generate a three-dimensional model of the physical road junction using the corresponding set of road segment models of the selected road junction configuration and to render the three-dimensional model of the physical road junction.

In another embodiment, a non-transitory computer readable medium including instructions for componentized junction models that when executed are operable to receive a plurality of characteristics of a road junction, to select a set of road segment models corresponding to the characteristics of the road junction, to generate a model of the road junction by assembling the set of road segment models and to render the three-dimensional model of the physical road junction.

BRIEF DESCRIPTION OF THE DRAWINGS

Exemplary embodiments of the present invention are described herein with reference to the following drawings.

DETAILED DESCRIPTION

Figure 1:
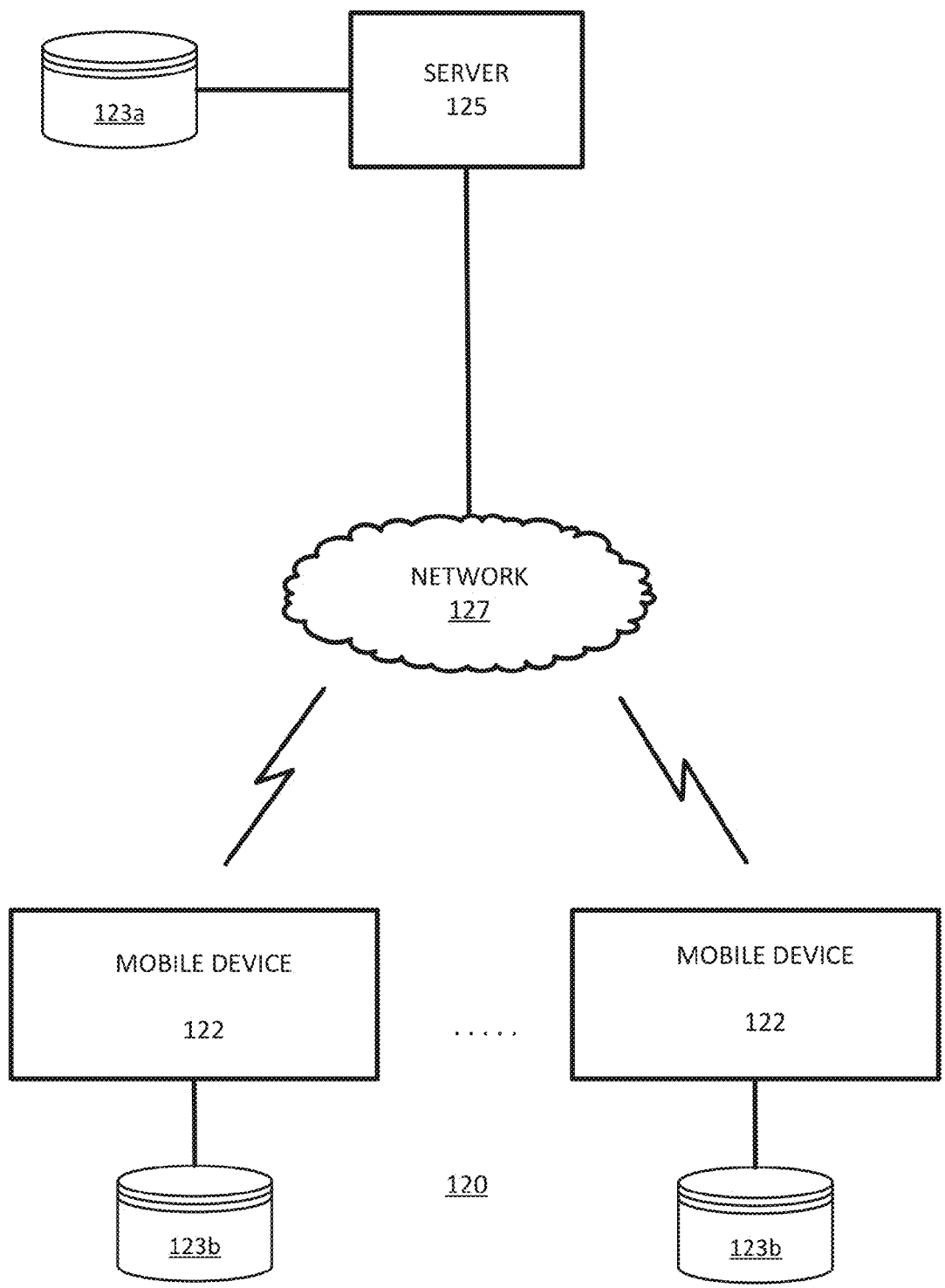
FIG. 1 illustrates an example map developer system according to an embodiment.

Some current navigation systems use unique two-dimensional (2D) junction view images or 2D renderings of three-dimensional (3D) junction models for every junction in a map database (e.g., still images for each road junction). Storing unique junction view images or unique models for each junction is very space-intensive. Other navigation systems use a limited set of generic 2D junction view images or 3D junction models to approximate actual junction configurations. Using generic junction view images or generic models is space-efficient, but yields limited fidelity with respect to the accuracy of junction topology, junction geometry, lane counts, and lane connectivity between road segments, and increasing fidelity requires a disproportionate increase in storage needs, often exponentially. There remains a need for navigation systems to be able to display junction view images for a very large variety of road junction configurations with reasonable verisimilitude using a relatively small amount of data in a storage-constrained system in order to provide guidance to users prior to performing driving maneuvers.

The following embodiments describe systems and methods for componentized junction models. A set of seamlessly interconnectable three-dimensional (3D) models of short road segments are provided that vary by shape and lane counts. The 3D models are assembled in various combinations to create a 3D model of an entire physical road junction. The complete model of the physical road junction may be rendered and displayed as a junction view image, using a static 2D rendering, a 3D animated view of the 3D model, or the like.

According to one or more embodiments, the interconnectable 3D component models are predefined with each component segment representing a short road segment. For example, the 3D component models may be divided into three general segment types or categories, such as: straight segments; curve segments; and fork segments (e.g., where one road segment splits into two or more road segments). The 3D component models also vary by shape and lane count within each segment type. For example, curve segments may bend left or right, may bend sharply or gradually, and/or may bend over a short or long distance. Further, curve segments may represent an ascending or descending cloverleaf ramp. Additionally, lane counts may vary within a single component model. For example, a straight component model may provide two lanes that expand to four lanes.

A set of supported junction configurations is also defined. Each junction configuration corresponds to a predefined set of 3D component models assembled in a specific way to generate a complete 3D model of a physical junction. Physical, actual real world road junctions may be mapped by an algorithm to determine the closest fitting junction configuration from the supported set of configurations. For any physical junction, the junction configuration that best fits the physical junction may vary depending on the route a navigation system chooses to navigate through the physical road junction (e.g., accuracy along the driven route is often a priority over accuracy of other parts of the 3D model that represent non-driven routes).

The embodiments may allow for a navigation system to generate and render a junction model, and display a road junction view in an extraordinarily space-efficient manner given the number of different approximated junction configurations supported by the navigation system. Further, the desired average fidelity of the junction model approximations may be increased or decreased by varying the number and type of component models included or defined, allowing the navigation system to be tailored to hardware limitations and the desired accuracy and fidelity of the end application. For example, in one embodiment, using approximately 2,500 component models, a navigation system may support more than $10^{24}$ different junction configurations. Further, in another embodiment, using approximately 750 components, roughly $10^{23}$ different junction configurations may be supported. In both instances, a reasonable storage footprint is maintained on the navigation device.

FIG. 1 illustrates map developer system according to an embodiment. The system 120 includes mobile devices 122 (e.g., navigation devices and/or assisted driving systems), a server 125 (e.g., a "cloud" server and/or a map developer system) and a network 127 (e.g., a cellular network). The databases 123*a* and 123*b* may be map databases including road links, segments and junctions. Additional, different, or fewer components of system 120 may be provided. For example, many varieties of mobile devices 122 may connect with the network 127, including mobile telephones, navigation systems, personal computers, assisted driving vehicles, etc. Assisted driving vehicles include autonomous vehicles, highly assisted driving (HAD) and advanced driving assistance systems (ADAS). An assisted driving device 122 may be included in the vehicle.

In an embodiment, the server 125 or a mobile device 122 identifies a road junction from the map database 123*a* or 123*b*, respectively. The map databases 123*a* and 123*b* include generalized 3D model templates or configurations of road junctions, rather than 2D images for each road junction, in order to provide realistic lane counts, lane connectivity, and road shapes for the physical road junctions. The generalized 3D model templates or configurations provide a complete specification of all road segment components needed to assemble a complete 3D model of a road junction and information on how to assemble the road segment components into the 3D model. The 3D model templates also include overpass and underpass road junction representation information. The map databases also include a look-aside table (LAT) used to store and identify each physical road junction that is supported. A 3D model will be displayed using the road junction template that best matches the physical road junction. In an example, map data for each physical road junction is added to the map database 123*a* and/or 123*b* (e.g., a core map) and is used to determine which model template best fits the physical road junction (e.g, using an algorithm). Junction inclusion rules may be performed to identify which physical road junctions that will be associated with 3D model templates. For example, off-ramps and highway-to-highway connectors may be included, while T-shaped or four-way intersections and roundabouts may be excluded. However, in other examples, additional, different or fewer model templates may be provided for other physical road junctions types.

Figure 2:
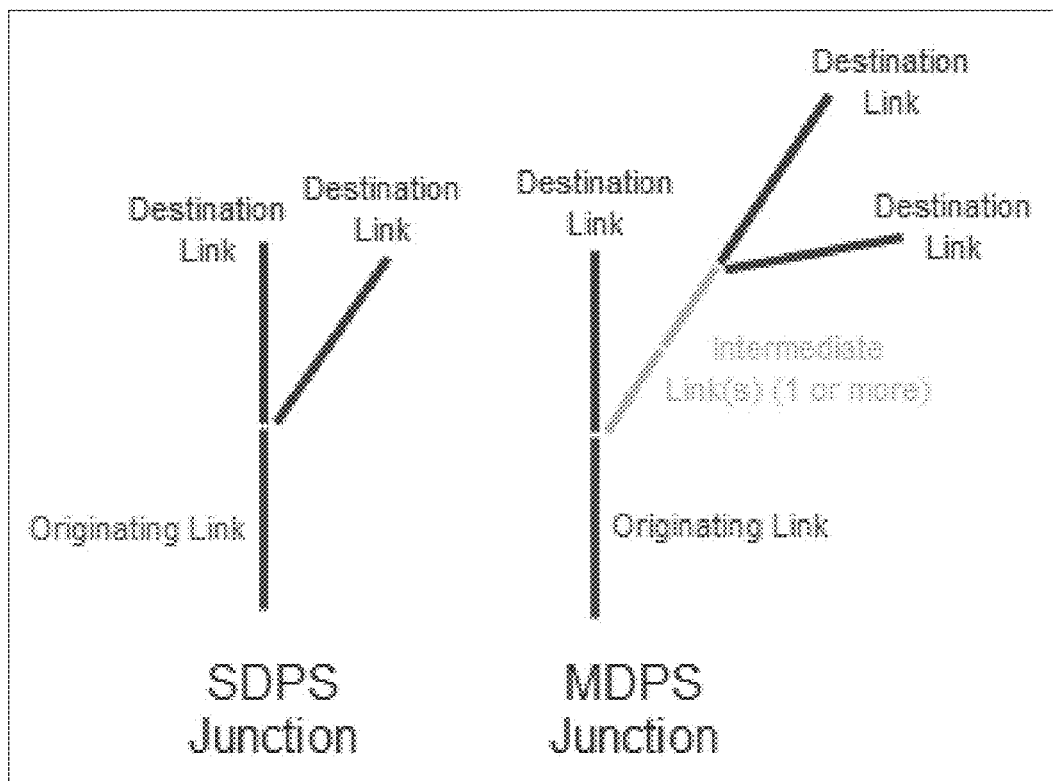
FIG. 2 illustrates an example of two road junction types.

FIG. 2 illustrates an example of two generalized road junction types. In this example, road junctions are generally one of two types: a single decision point situation (SDPS); or a multiple decision point situation (MDPS). Additional, different or fewer generalized road junction types may be included, such as three-way, four-way and higher order decision point situations. For example, implementations for two-way splits in a roadway can be expanded to other implementations to support three-way, four-way, and higher order roadway splits. As depicted in FIG. 2, each decision point situation includes an originating link that is the road segment immediately preceding a divergence, referred to as a decision point. Each decision point situation includes destination links that are the road segments following a decision point. For example, single decision point situations (SDPS) include an originating link that divides into one or more destination links. FIG. 2 depicts a SDPS with an originating link dividing into exactly two destination links. Multiple decision point situations (MDPS) include an originating link that divides into one or more links, including a destination link and an intermediate link. Intermediate links provide a continuous path between two decision points and are not considered destination links. For example, after a first decision point (DP1), an intermediate link leads to a second decision point (DP2). An intermediate link then divides into one or more destination links. One or more intermediate lanes may divide DP1 from DP2. In an example, the second decision point occurs within a limited distance from the first decision point (e.g., 250 meters). FIG. 2 also depicts a multiple decision point situation (MDPS) dividing into exactly two links: a destination link and an intermediate link. The intermediate link then divides again into exactly two more destination links.

Figure 3:
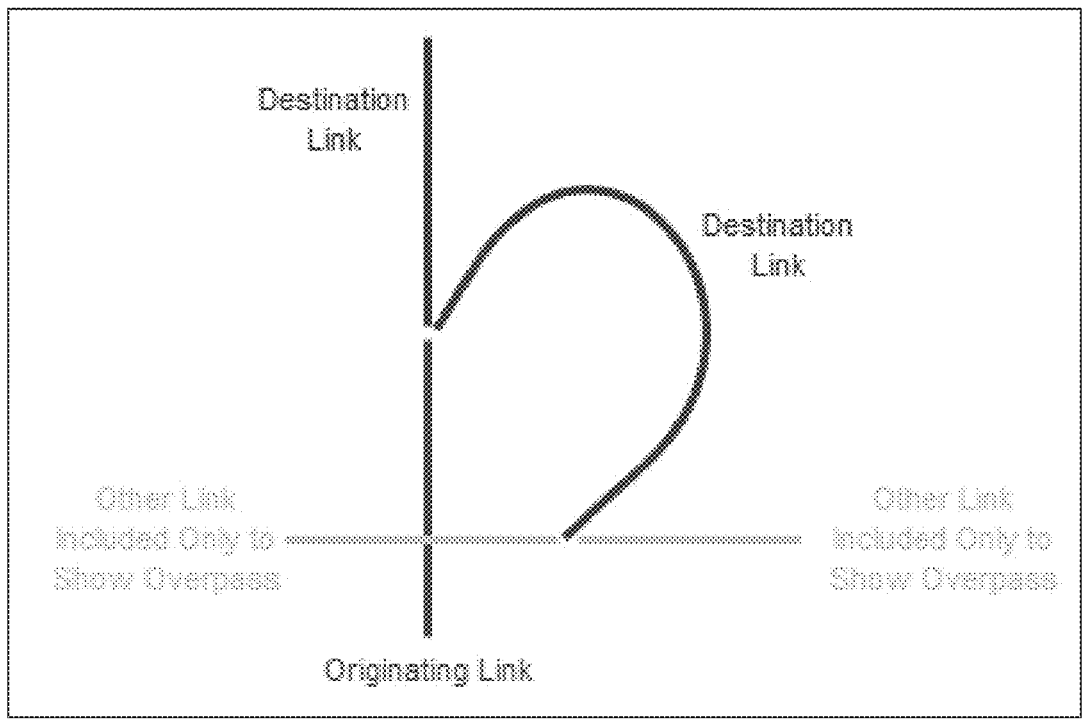
FIG. 3 illustrates an example of a single decision point situation including a cloverleaf-style destination link.

FIG. 3 illustrates an example of a single decision point situation including a cloverleaf-style destination link. Road junctions that include cloverleaf-style overpasses or underpasses along the driven path may receive special treatment, as discussed below. A 3D model for a road junction includes an overpass or underpass if a destination link or intermediate link circles back and crosses over the path of the originating link at a different grade within a set distance (e.g., ascending or descending). Additional overpasses and underpasses that may be visible to a driver navigating a physical road junction may not be displayed.

Figure 4:
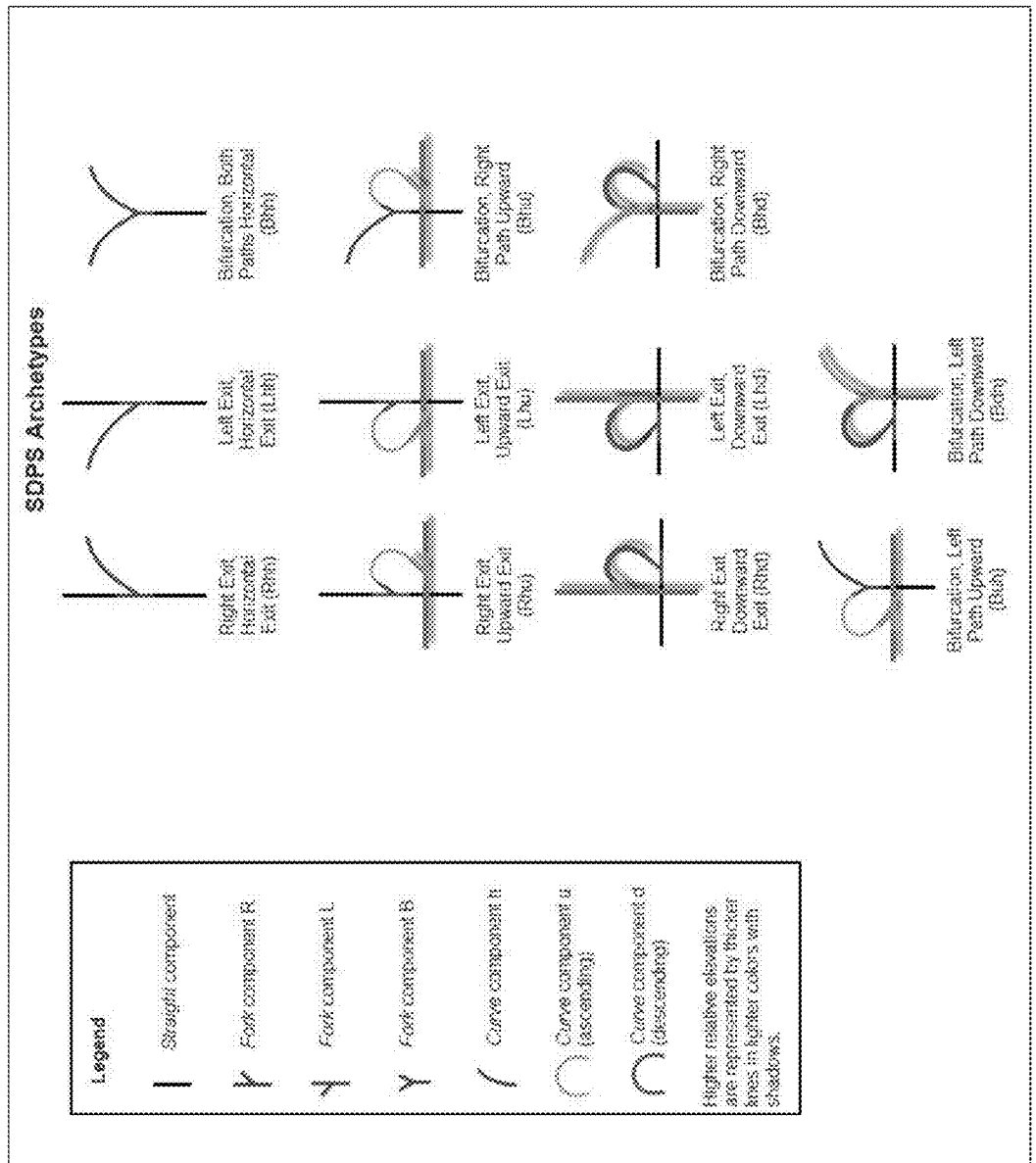
FIGS. 4-5 illustrate an example of a set of supported road junction archetypes according to an embodiment.
Figure 5:
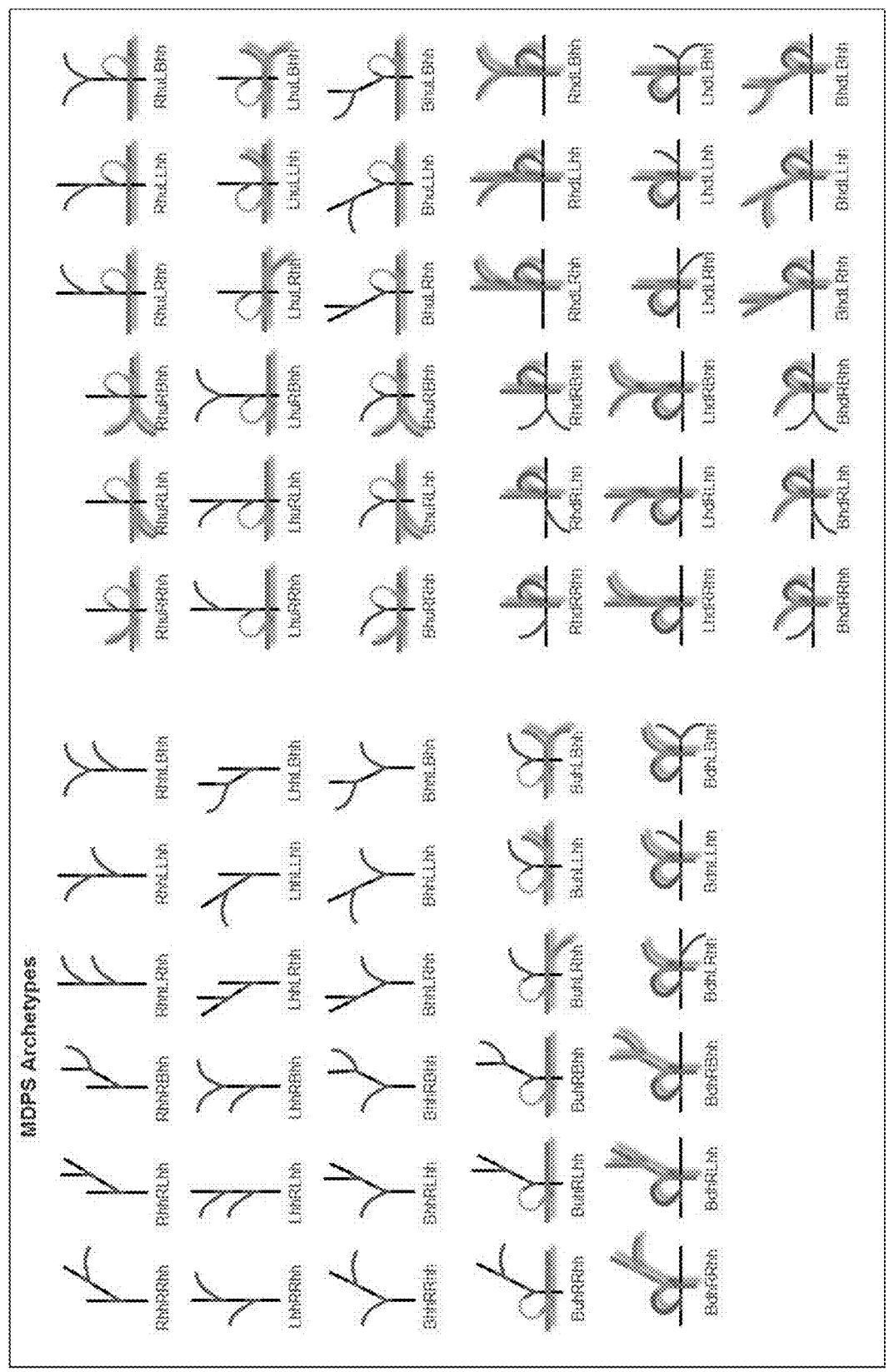

FIGS. 4-5 illustrate an example of a set of supported road junction archetypes. For example, a right or left exit designates that after a decision point, one path continues in the same general direction set by the originating link and another exit path veers off to the right or left. A bifurcation designates that two paths diverge from the originating link such that no path continues in the same general direction set by the originating link (e.g., may be modeled as a symmetric "Y" shaped intersection that smoothly veers away from the general direction set by the originating link). Each supported road junction may be coded using a syntax or other methodology for identifying each type of road junction. For example, FIGS. 4-5 include a syntax for identifying various road junction archetypes for single and multiple decision point situations. As depicted in FIGS. 4-5, each type of decision point situation is described using the following syntax: "R" representing a right exit; "L" representing a left exit; "B" representing a bifurcation; "h" representing a horizontal fork or curve; "u" representing an ascending or upward curve; and "d" representing a descending or downward curve.

In addition to the road junction archetypes, the 3D model of a physical road junction may also include accurate lane counts and lane connectivity for the junction. For example, for each physical road junction fitting an archetype, the number of lanes in the originating link, destination links, and intermediate links can vary. Modeling accurate lane counts for originating and destination links may be simple to implement because each originating or destination link is a single link connected to a single decision point. However, intermediate links may include multiple links between two decision points of a MDPS junction, with each intermediate link having a different lane count and lane connections. For example, overpass and underpass junctions often have different lane counts between intermediate links. Including accurate lane counts and connectivity for intermediate links may increase the complexity of the model, therefore intermediate links may be represented in an abstract manner to simplify the design and limit complexity of junction models. Further, for junctions that do not include an overpass or underpass, the entire chain of intermediate links may be treated as a single intermediate link. In this example, the lane count used for modeling a single representative intermediate link is determined by the intermediate link immediately preceding the second decision point.

For road junctions that include an overpass or underpass, treating intermediate links as a single link may not be desirable because the number of lanes in a cloverleaf exit may be as important to a user visually as the number of lanes in the overpass or underpass road segment (e.g., if the intermediate links lead to a second decision point). For this reason, overpass and underpass junctions may be modeled accurately with the correct number of lane counts for each road segment (e.g., with other intermediate segments abstracted). In this example, when a ramp lane count differs from an overpass or underpass lane count, a transition may be provided to join the cloverleaf ramp with the overpass or underpass.

Figure 6:
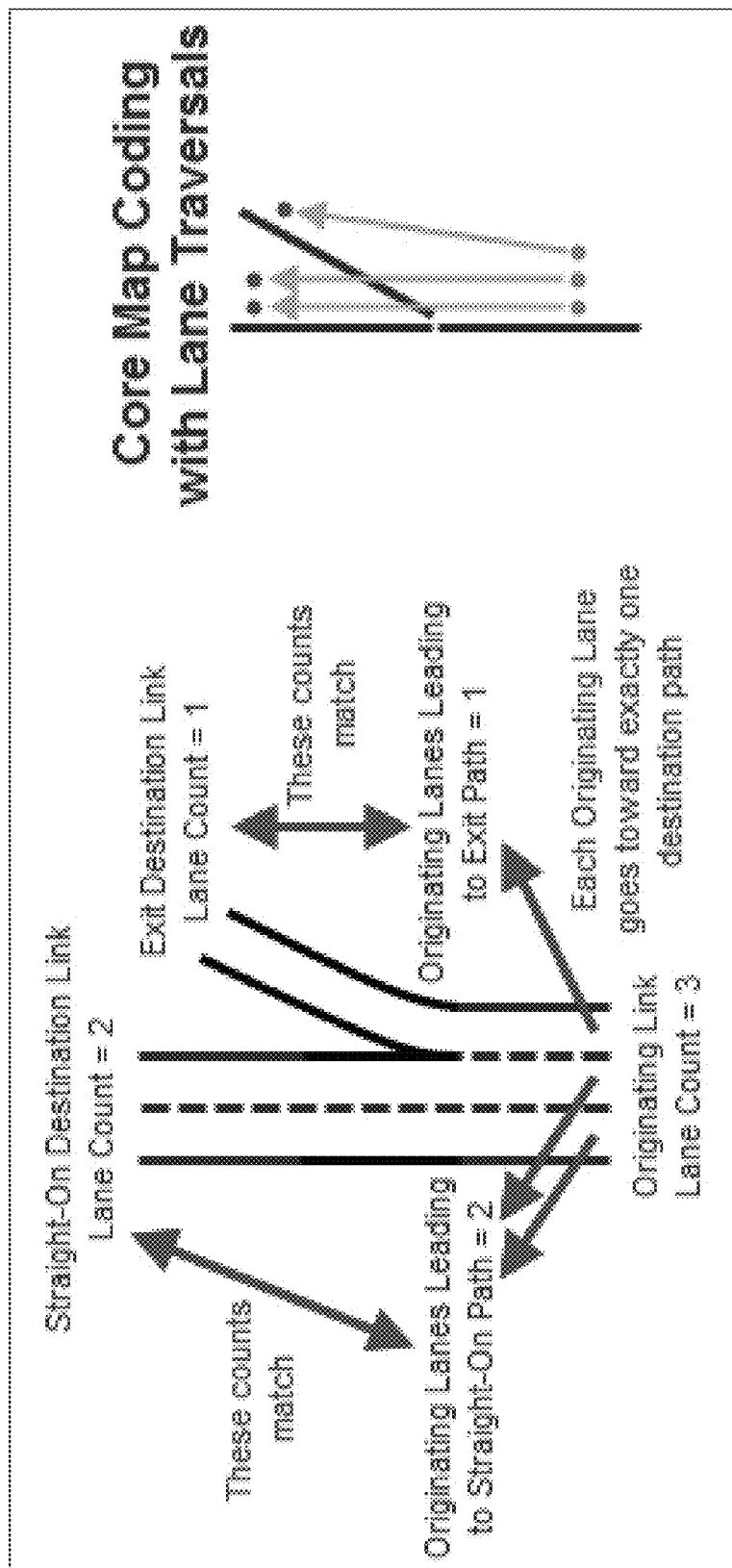
FIG. 6 illustrates an originating link with three lanes connecting to a straight destination link with two lanes and an exit destination link with one lane.
Figure 7:
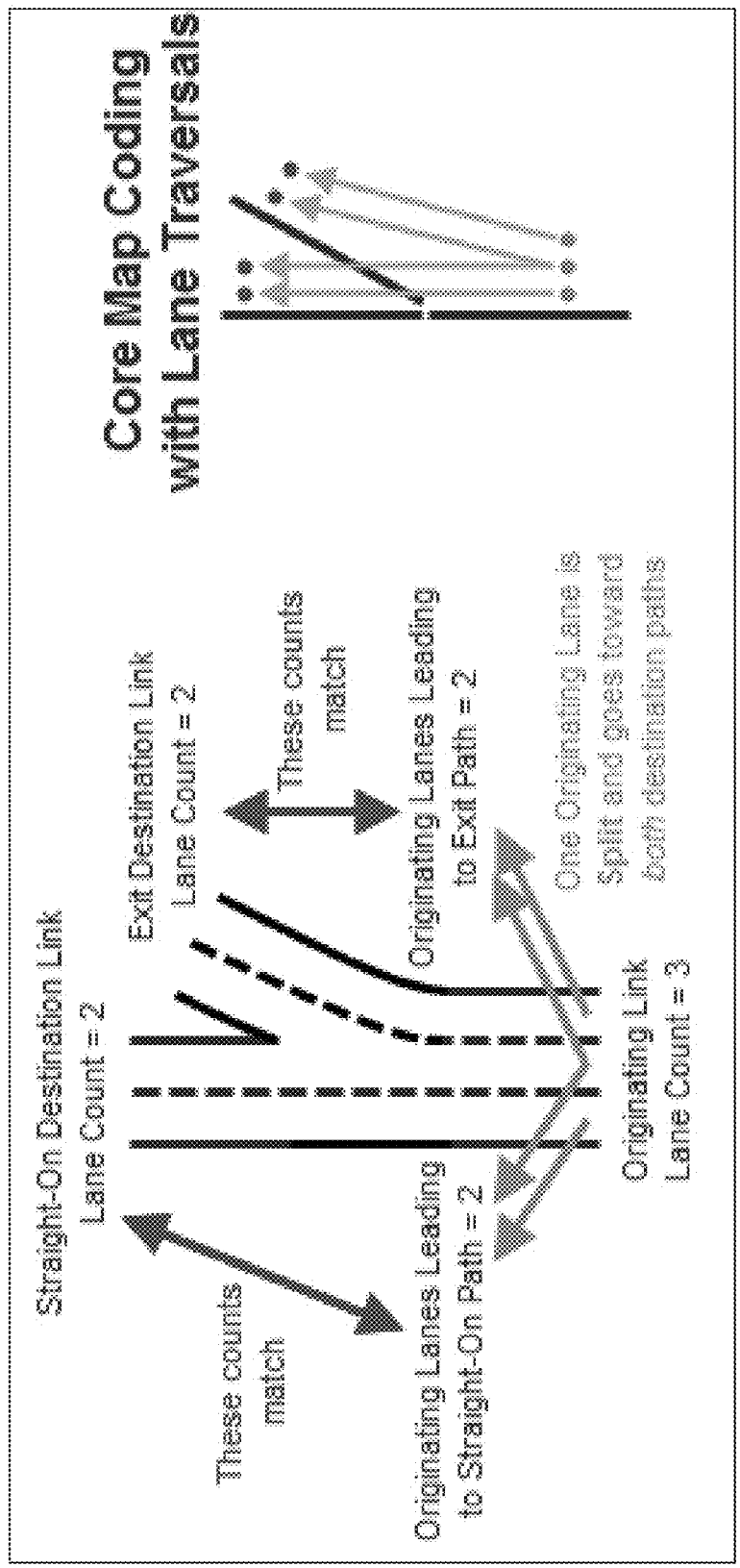
FIG. 7 illustrates an originating link with three lanes connecting to a straight destination link with two lanes and an exit destination link of two lanes.
Figure 8:
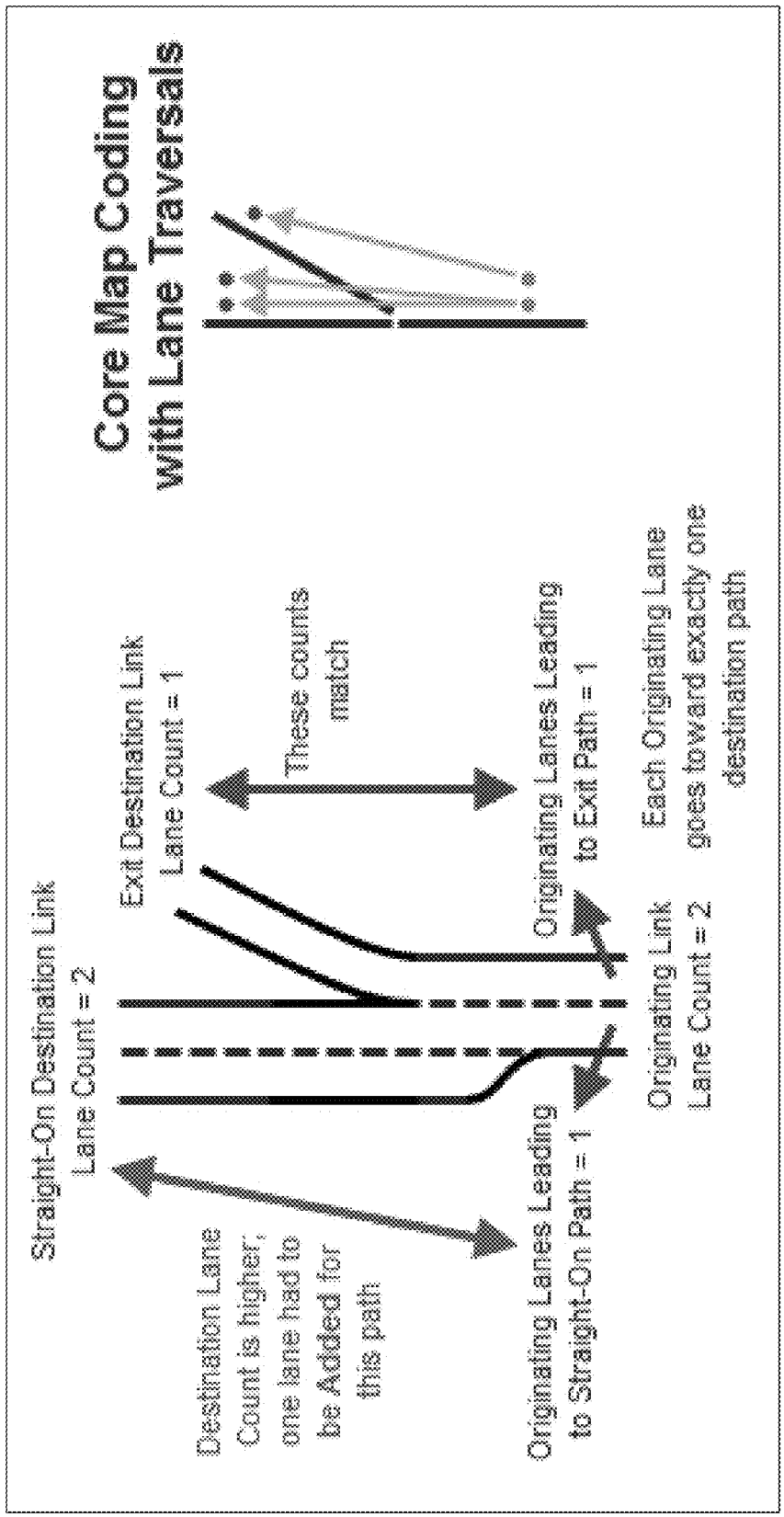
FIG. 8 illustrates an originating link with two lanes connecting to a straight destination link with two lanes and an exit destination link of one lane.
Figure 9:
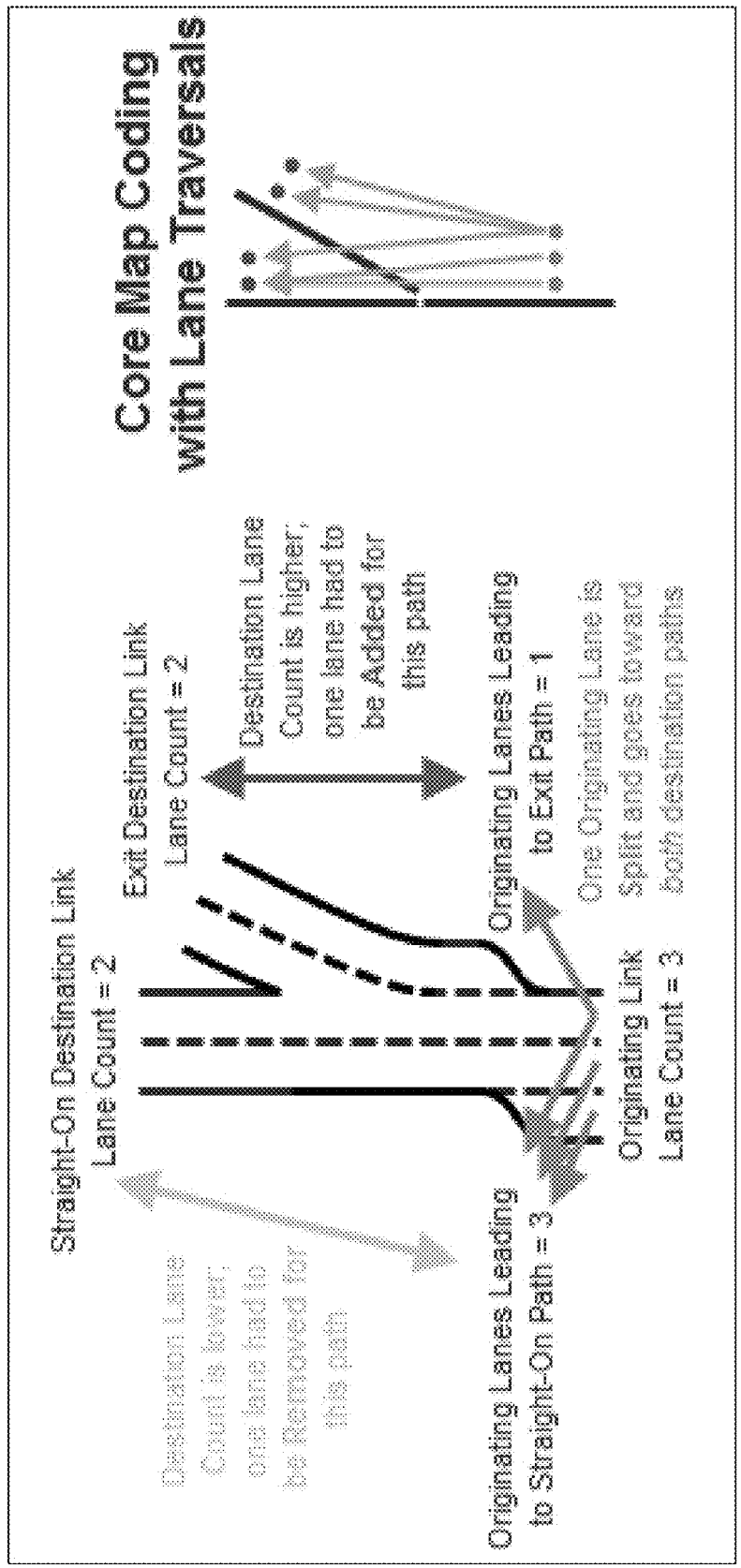
FIG. 9 illustrates an originating link with three lanes connecting to a straight destination link with two lanes and an exit destination link of two lanes.

Accurate lane connectivity may also be modeled for a road junction. For different variations in lane counts for a given archetype, the lanes in the originating link connect to the lanes in the destination links in various ways. For example, lanes may connect directly, or may connect by splitting, adding or removing lanes. For example, FIGS. 6-9 depict examples of lane connectivity with segments of varying lane counts. FIG. 6 depicts an originating link with three lanes connecting to a straight destination link with two lanes and an exit destination link with one lane. As depicted in FIG. 6, every lane in the originating link connects directly to a lane in one of the destination links. FIG. 7 depicts an originating link with three lanes connecting to a straight destination link with two lanes and an exit destination link of two lanes. As depicted in FIG. 7, the center lane of the originating link splits into two lanes, with one lane connecting to a lane of the straight destination link and one lane connecting to the exit destination link. FIG. 8 depicts an originating link with two lanes connecting to a straight destination link with two lanes and an exit destination link of one lane. As depicted in FIG. 8, a lane is added to the left lane of the originating link and connects to the two lanes of the straight destination link. The right lane of the originating link connects directly to the lane of the exit destination link. Lanes may be removed in the same manner. FIG. 9 depicts an originating link with three lanes connecting to a straight destination link with two lanes and an exit destination link of two lanes. As depicted in FIG. 9, the left lane is removed from the originating link and the right two lanes connect to the two lanes of the straight destination link. The right lane of the originating link splits and connects to the left lane of the exit destination link. A lane is added to the originating link and connects to the right lane of the exit destination link.

In the examples provided above, the addition and removal of lanes is one methodology to accurately model lane connectivity. As such, the lane additions and removals may not exactly match the lane connectivity reality. However, adding and removing lanes in the model produces accurate lane connectivity for visualizing a road junction. For example, in FIG. 8, the leftmost originating lane connects to both lanes in the left destination link. This is modeled by adding a lane on the left side of the originating link just before the split point. In FIG. 9, removing a lane on the left of the originating link and adding a lane on the right is modeled such that all three originating lanes continue straight and only the rightmost lane exits to the right. In these examples, the accuracy of the modeled connectivity is more important than accurate lane counts.

Given the number of possible lane and connectivity variations for the road junction archetypes, a syntax or naming convention for constructing the 3D model may be used. For example, to construct single decision point situations, the following naming convention may be used: A BCD EFGH Z; where A represents the junction configuration, BCD represents the originating link lane counts, EFGH represents the destination link lane counts, and Z represents the conditional overpass or underpass lane count. Using this example naming convention, the following rules may be applied to model a physical road junction. For example, A is the type of decision point, with "R" for right exit, "L" for left exit, or "B" for bifurcation at the decision point. B is the number of originating lanes leading to the decision point. For a right or left exit (e.g., if A is "R" or "L"), C is the number of originating lanes leading to the straight-on path, D is number of originating lanes leading to the exit path, E is type of the straight-on destination path, with "h" for a normal horizontal road (e.g., cloverleaf ramps may not be allowed), F is number of destination lanes in the straight-on destination path, G is the type of the exiting destination path, with "h" for a normal horizontal road, "u" for ascending (up) cloverleaf ramp, and "d" for descending (down) cloverleaf ramp, and H is number of destination lanes in the exiting path. For a bifurcation (e.g., if A is "B"), C is the number of originating lanes leading to the left path, D is the number of originating lanes leading to the right path, E is the type of the left destination path, with "h" for a normal horizontal road, "u" for ascending (up) cloverleaf ramp, and "d" for descending (down) cloverleaf ramp, F is the number of destination lanes in the left path, G is the type of the right destination path, with "h" for a normal horizontal road, "u" for ascending (up) cloverleaf ramp, and "d" for descending (down) cloverleaf ramp, H is the number of destination lanes in the right path, and Z is the number of overpass or underpass lanes (e.g., only present if E or G is "u" or "d") allowing the lane count of the road crossing over or under to differ from the lane count of the cloverleaf ramp destination path. The archetypes in FIG. 4 are labeled AEG.

To construct multiple decision point situations, the following naming convention may be used: A BCD EFGH J K LMN PQRS Z. A represents the junction configuration, BCD represents the originating link lane counts, EFGH represents the first destination and intermediate link(s) lane counts, J represents the side of the second decision point, K represents the second decision point junction configuration, LMN represent intermediate link lane counts, PQRS represent the second decision point destination link lane counts, and Z represents the conditional overpass or underpass lane count. Using this example naming convention, the following rules may be applied to model a physical road junction. For example, A is the type of the first decision point, with "R" for right exit, "L" for left exit, or "B" for bifurcation at the first decision point. B is the number of originating lanes leading to the first decision point. For a right or left exit (e.g., if A is "R" or "L"), C is the number of originating lanes leading to the straight-on path of the first decision point, D is number of originating lanes leading to the exit path of the first decision point, E is type of the straight-on destination path, with "h" for a normal horizontal road (e.g., cloverleaf ramps may not be allowed), F is number of destination lanes in the straight-on destination path of the first decision point, G is the type of the exiting destination path of the first decision point, with "h" for a normal horizontal road, "u" for ascending (up) cloverleaf ramp, and "d" for descending (down) cloverleaf ramp, and H is number of destination lanes in the exiting path of the first decision point. For a bifurcation (e.g., if A is "B"), C is the number of originating lanes leading to the left path of the first decision point, D is the number of originating lanes leading to the right path of the first decision point, E is the type of the left destination path of the first decision point, with "h" for a normal horizontal road, "u" for ascending (up) cloverleaf ramp, and "d" for descending (down) cloverleaf ramp, F is the number of destination lanes in the left path of the first decision point, G is the type of the right destination path of the first decision point, with "h" for a normal horizontal road, "u" for ascending (up) cloverleaf ramp, and "d" for descending (down) cloverleaf ramp, and H is the number of destination lanes in the right path of the first decision point.

For the second decision point, J identifies whether the second decision point is reach from the right or left branch (e.g., "R" for right and "L" for left), K is the type of the second decision point, with "R" for right exit, "L" for left exit, or "B" for bifurcation at the second decision point, L is the number of intermediate lanes leading to the second decision point. For a right or left exit (e.g., if K is "R" or "L"), M is the number of intermediate lanes leading to the straight-on path of the second decision point, N is number of intermediate lanes leading to the exit path of the second decision point, P is type of the straight-on destination path, with "h" for a normal horizontal road (e.g., cloverleaf ramps may not be allowed), Q is number of destination lanes in the straight-on destination path of the second decision point, R is the type of the exiting destination path of the second decision point, with "h" for a normal horizontal road, "u" for ascending (up) cloverleaf ramp, and "d" for descending (down) cloverleaf ramp, and S is number of destination lanes in the exiting path of the second decision point. For a bifurcation (e.g., if K is "B"), M is the number of originating lanes leading to the left path of the second decision point, N is the number of originating lanes leading to the right path of the second decision point, P is the type of the left destination path of the second decision point, with "h" for a normal horizontal road, "u" for ascending (up) cloverleaf ramp, and "d" for descending (down) cloverleaf ramp, Q is the number of destination lanes in the left path of the second decision point, R is the type of the right destination path of the second decision point, with "h" for a normal horizontal road, "u" for ascending (up) cloverleaf ramp, and "d" for descending (down) cloverleaf ramp, and S is the number of destination lanes in the right path of the second decision point. Z is the number of overpass or underpass lanes (e.g., only present if E or G is "u" or "d") when the overpass or underpass does not lead to the second decision point, allowing the lane count of the road crossing over or under to differ from the lane count of the cloverleaf ramp destination path. For example, the following combinations may be permissible: if A is "B", E is "u" or "d", and J is "R", then the left branch is a cloverleaf ramp and the right branch leads to the second decision point; if A is "L", G is "u" or "d", and J is "R", then the left branch is a cloverleaf ramp and the right branch leads to second decision point; and if A is "R" or "B", G is "u" or "d", and J is "L", then the right branch is a cloverleaf ramp and the left branch leads to second decision point. Additional, different or fewer combinations may be provided. Based on naming scheme discussed above, the archetype for a MDPS junction as shown in FIG. 5 is defined by AEGJKPR. This naming scheme is provided as an exemplary embodiment of componentized junction templates. Other naming conventions may be employed. Further, additional naming convention examples are provided below and in the figures that combine template names and with other concepts disclosed herein.

In the example naming convention provided above, lane count limits may be provided. For example, setting limits on the number of lanes represented for the originating, destination and intermediate links may limit the total number templates required, simplifying the implementation, but may result in less accurate junction models. In an implementation, the following lane count limits may be provided: originating links may be one to eight lanes; straight-on destination or intermediate link lanes may be one to eight lanes; exiting destination or intermediate link lanes (e.g., non-cloverleaf ramps) may be one to eight lanes; exiting destination or intermediate link lanes (e.g., cloverleaf ramps) may be one to two lanes; destination link lanes after a bifurcation may be one to eight lanes; and overpass or underpass lanes may be one to eight lanes. Further, adding and removing lanes may be limited, such as a maximum of two originating or intermediate link lanes may be removed at a decision point along one path through that decision point and a maximum of four destination or intermediate link lanes may be added at decision point along one path through that decision point. Additional, different or fewer lane count limits may be provided.

Using the naming convention discussed above, accurate three-dimensional models of physical road junctions are constructed using component models of short road segments that vary by shape and lane counts. The component models are selected using the naming convention described above, and are connected together to model the physical road junction. In this example, the junction template name indicates a specific set of component models that are used to generate the road junction model. Using the syntax discussed above, three categories of component models are used: straight components; fork components; and curve components. Straight components model a straight segment of road with a specified lane count, and may have lanes added or removed on either side. Fork components model a path divergence (e.g., either a left exit, right exit, or bifurcation) with a specified lane count. In this example, lanes are not added or removed from a fork component, but lanes may split and follow one or more paths of a fork component. Curve components model a curved segment of road with a specified lane count. In this example, lanes are not added or removed from a curve component.

Figure 10:
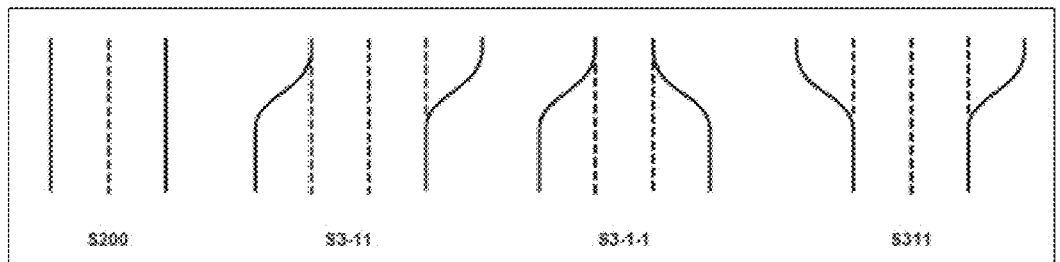
FIGS. 10A-10D illustrate examples of component models for modeling a physical road junction according to an embodiment.
Figure 10:
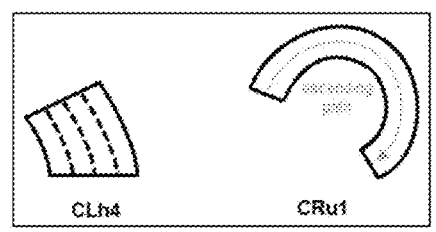
Figure 10:
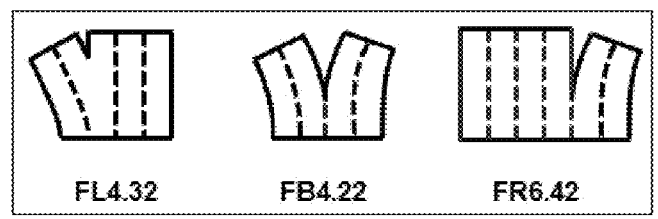
Figure 10:
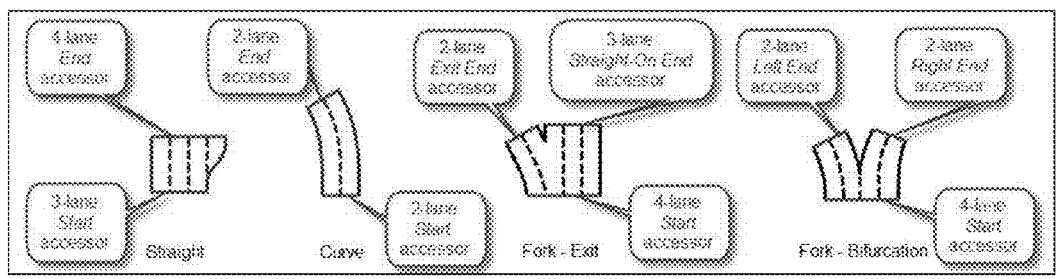

FIGS. 10A-10D depict examples of component models for modeling a physical road junction. Another syntax or naming convention may be used for identifying the component models. For example, straight component models may adhere to the following convention: SXYZ. As depicted in FIG. 10A, "S" indicates a straight component, "X" represents number of lanes at the near end (in the driving direction) of the component model, "Y" represents the change in number of lanes on the left side between the near and far ends of the component model (e.g., positive when adding lanes and negative when removing lanes), and "Z" represents the change in number of lanes on the right side between the near and far ends of the component model (e.g., positive when adding lanes and negative when removing lanes). Further, curve component models may adhere to the following convention: CXYZ. As depicted in FIG. 10B, "C" indicates a curved component, "X" represents direction of the curve (e.g., "L" for a curve that bends left and "R" for a curve that bends right), "Y" represents the curve type (e.g., "h" for a normal horizontal curve, "u" for an ascending (up) cloverleaf ramp and "d" for a descending (down) cloverleaf ramp), and "Z" represents the lane count for the curve. Finally, for component models may adhere to the following convention: FAB.CD. As depicted in FIG. 10C, "F" indicates a fork component, "A" represents the fork direction ("R" for a right exit, "L" for a left exit or "B" for a bifurcation), and "B" represents the lane count at the near end of the component (e.g., may be a one-digit or two-digit number, hence the need for the period between "B" and "C"). If "A" is "R" or "L", then "C" represents the destination lane count on the straight path and "D" represents the destination lane count on the exit path. If "A" is "B", then "C" represents the destination lane count in the left path and "D" represents the destination lane count in the right path.

Various component models connect together by mating their accessors. FIG. 10D depicts an example of the accessors for each type of component, along with an example naming convention (e.g., "Start," "Left End," etc.). For example, an accessor of n lanes in a given component model connects seamlessly to an n lane accessor of any other model.

Figure 11:
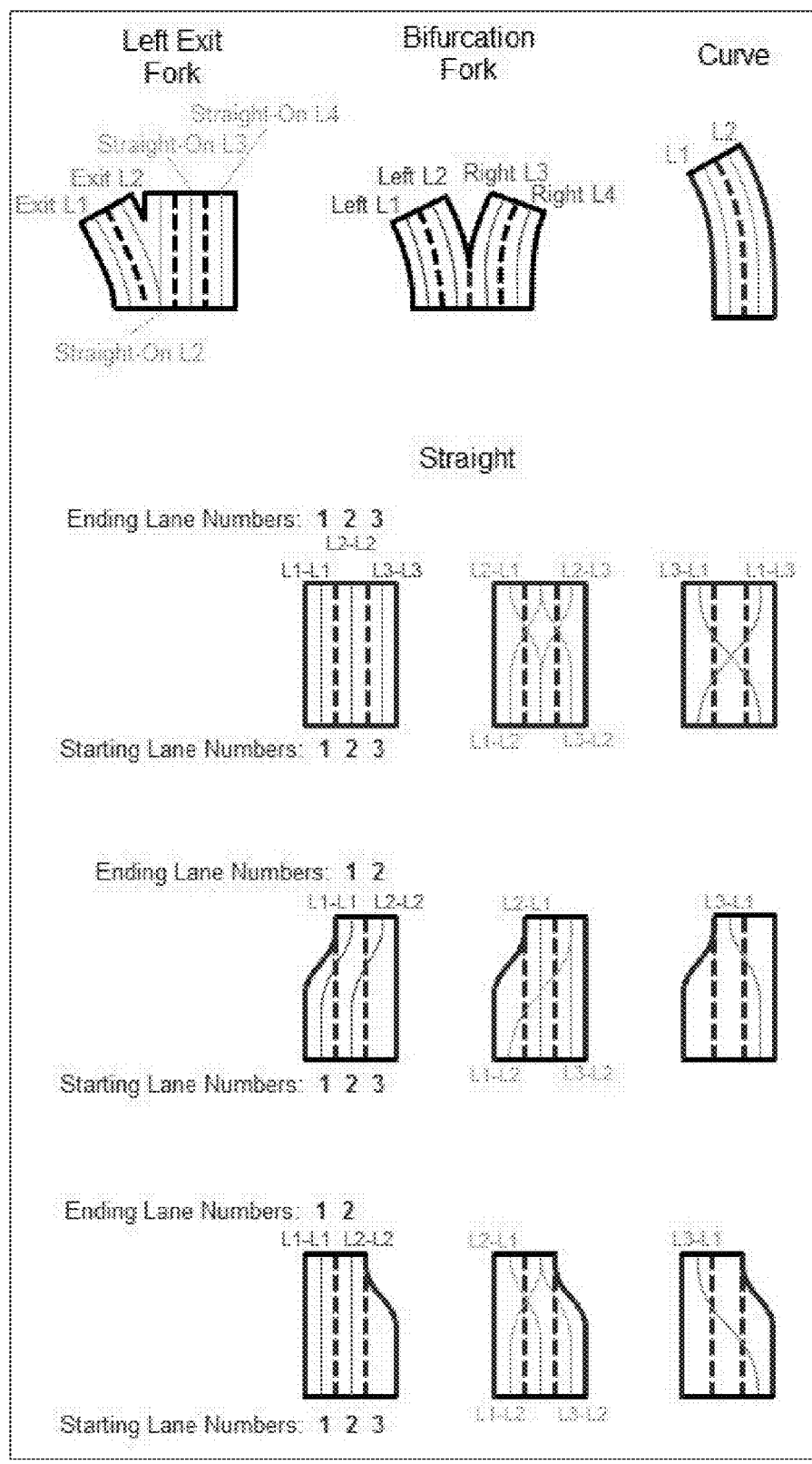
FIG. 11 illustrates an example of driving path splines.
Figure 12:
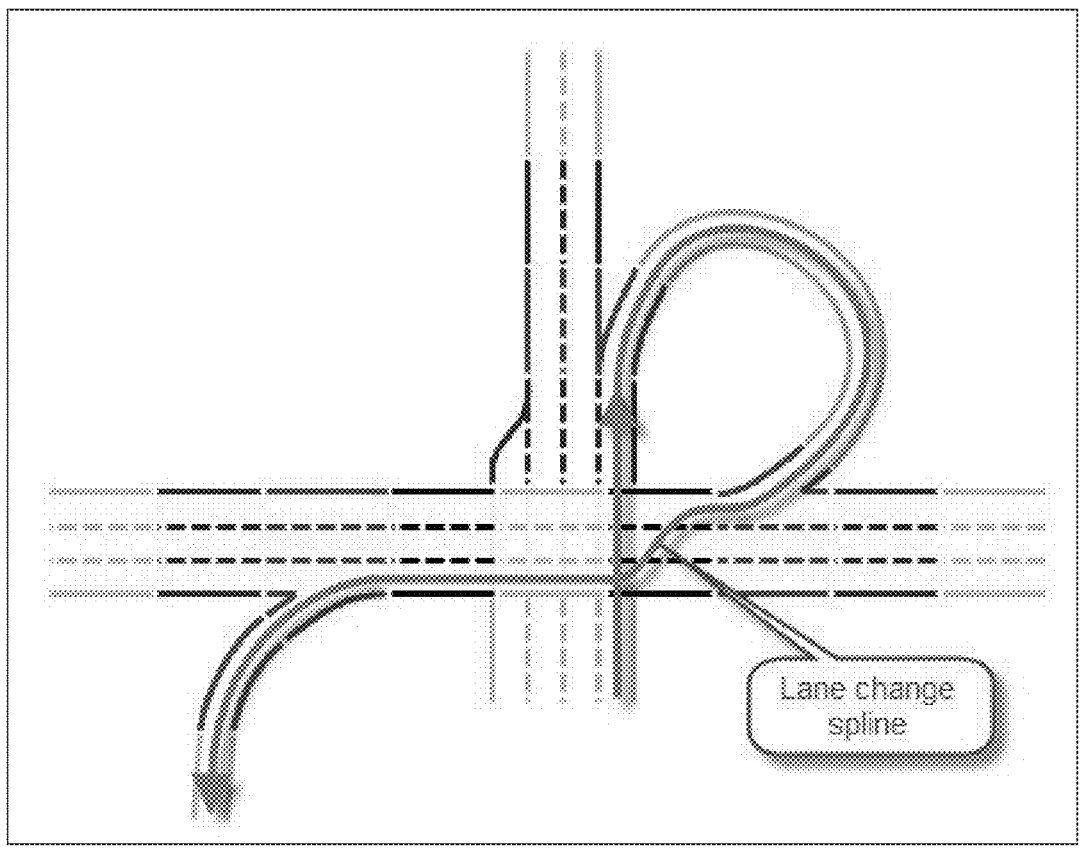
FIG. 12 illustrates an example of driving guidance using driving path splines.

Component models may also include driving path splines. As depicted in FIG. 11, driving path splines run down the center of each lane and are used to define a path of travel through the road junction model (e.g., for each lane-level path). For example, driving path splines are used to define a path for lane change maneuvers in straight component models where lanes are added and/or removed. Lane change splines may also be used to trace paths for guidance arrows in MDPS junctions. For example, in FIG. 12, lane change splines are used for guidance through a second decision point (DP2) that follows a cloverleaf ramp. In some implementations, lane change guidance is only provided through cloverleaf ramps.

In another implementation, junction templates may include lane change guidance before reaching a road junction. For example, lane change guidance may be provided using a straight segment of a constant lane width (e.g., S100, S200, . . . , S800) placed before the first segment of the road junction. In this implementation, the straight road segment will have splines showing all possible lane changes and with metadata labels associated with each spline. For example, FIG. 11 depicts lane change splines for various component segments, with the spline information referenced by a metadata label. In some implementations, components used to provide lane change guidance and those assembled to form junction models may differ. For example, lane change models and junction models may be generated separately and joined together and so as to appear as a single model. Lane change guidance models may be generated separately with different characteristics.

As discussed above, each junction template identifies a set of component models to be connected together in a particular way. Each component model is provided with a different label (e.g., according to a naming convention). In an implementation, each junction template is provided a row in a look-aside table (LAT) and the corresponding component labels for each junction template are included in columns of a look-aside table (e.g., containing the specific component model names for the junction template). Further, a different junction template may be specified for each route through a given junction archetype. Alternatively, one junction template may be used for all routes through a junction archetype. In this implementation, the look-aside table contains a set of rows for each different junction archetype. Each row represents one route through a junction archetype. For example, assuming only two-way splits, a junction archetype with a single decision point situation has two rows in the look-aside table (e.g., one row for each route through the road junction). A junction archetype with a multiple decision point situation has three rows in the look-aside table (e.g., the second decision point of every multiple decision point junction may be represented by a separate single decision point situation junction). Using a LAT is only one exemplary implementation, thus listing the component models in LAT columns is not always necessary. For example, component models may be derived from the junction template name.

When a look-aside table is used, not all columns (e.g., component model parts) are used in every junction. When component model part is unused, the column will be left blank. Additionally, fillers may be used to extend the ends of components to fill up space to achieve a desired model size.

For example, fillers may be used to prevent small models from abruptly ending or to decrease the model size and complexity by decreasing the number of components in each model. The filler counts may not be derived from the template name. When a filler part name is blank, the corresponding count value will also be left blank. In this implementation, the following columns are included in the look-aside table for each route:

| | |
|---|---|
| DP_NODE_ID | First decision point's Node ID. |
| ORIGINATING_LINK_ID | Origin Link ID (PVID) - link immediately prior to and entering the first decision point. |
| DEST_LINK_ID | Destination link ID (PVID) - links immediately following and exiting the decision point. |
| JUNCTION_TEMPLATE_NAME | Indicates the junction template to display for this route through this decision point. |
| SIDE | Indicates whether the destination link is leftmost ('L'), rightmost ('R'), or middle ('M') when viewed from the origin link on entering the first decision point. This also indicates which arrows in the junction model to display when travelling from the origin link to the destination. |
| LATITUDE | The latitude of the first decision point. |
| LONGITUDE | The longitude of the first decision point. |
| MDPS | Indicates if given record is part of a multiple decision point ('Y'/'N'). 'N' for SDPS junctions. |
| DP2_NODE_ID | Decision point #2 node ID. |
| DP1_INCOMING | Component model used in the named position within the junction template. |
| DP1_INCOMING_FILLER | Component model used in the named position within the junction template. |
| DP1_INCOMING_FILLER_COUNT | Number of DP1_INCOMING_FILLER parts to include. |
| DP1_FORK | Component model used in the named position within the junction template. |
| DP1_OUTGOING_1 | Component model used in the named position within the junction template. |
| DP1_OUTGOING_1_FILLER | Component model used in the named position within the junction template. |
| DP1_OUTGOING_1_FILLER_COUNT | Number of DP1_OUTGOING_1_FILLER parts to include. |
| DP1_OUTGOING_2 | Component model used in the named position within the junction template. |
| DP1_OUTGOING_2_FILLER | Component model used in the named position within the junction template. |
| DP1_OUTGOING_2_FILLER_COUNT | Number of DP1_OUTGOING_2_FILLER parts to include. |
| DP1_MERGE | Component model used in the named position within the junction template. |
| DP1_MERGE_INCOMING | Component model used in the named position within the junction template. |
| DP1_MERGE_INCOMING_FILLER | Component model used in the named position within the junction template. |
| DP1_MERGE_INCOMING_FILLER_COUNT | Number of DP1_MERGE_INCOMING_FILLER parts to include. |
| DP1_MERGE_OUTGOING | Component model used in the named position within the junction template. |
| DP1_MERGE_OUTGOING_FILLER | Component model used in the named position within the junction template. |

-continued

| | |
|---|---|
| DP_NODE_ID | First decision point's Node ID. |
| DP1_MERGE_OUTGOING_FILLER_COUNT | Number of DP1_MERGE_OUTGOING_FILLER parts to include. |
| DP2_INCOMING | Component model used in the named position within the junction template. |
| DP2_FORK | Component model used in the named position within the junction template. |
| DP2_OUTGOING_1 | Component model used in the named position within the junction template. |
| DP2_OUTGOING_1_FILLER | Component model used in the named position within the junction template. |
| DP2_OUTGOING_1_FILLER_COUNT | Number of DP2_OUTGOING_1_FILLER parts to include. |
| DP2_OUTGOING_2 | Component model used in the named position within the junction template. |
| DP2_OUTGOING_2_FILLER | Component model used in the named position within the junction template. |
| DP2_OUTGOING_2_FILLER_COUNT | Number of DP2_OUTGOING_2_FILLER parts to include. |

Figure 13:
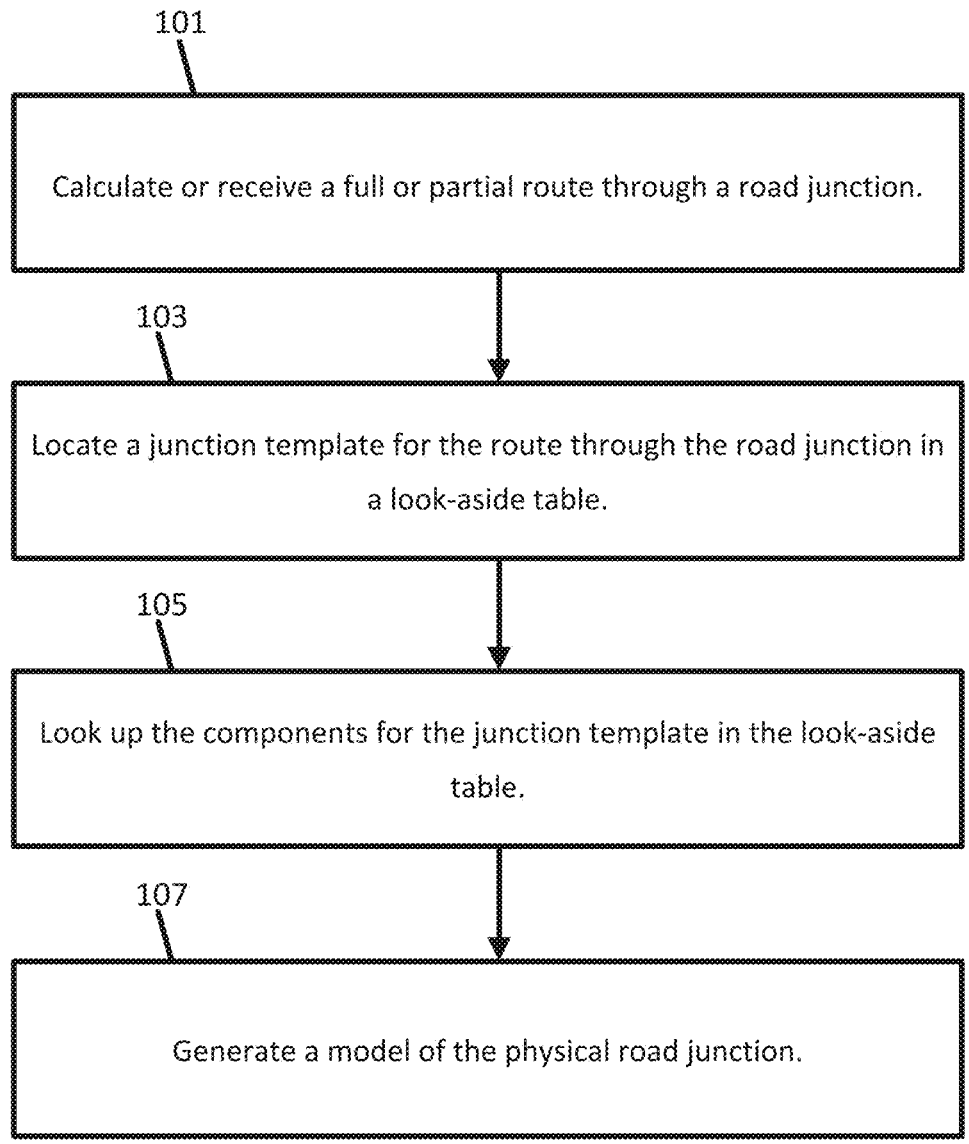
FIG. 13 illustrates a flowchart diagram of an embodiment of a method for constructing a componentized junction model using a look-aside table.
Figure 14A:
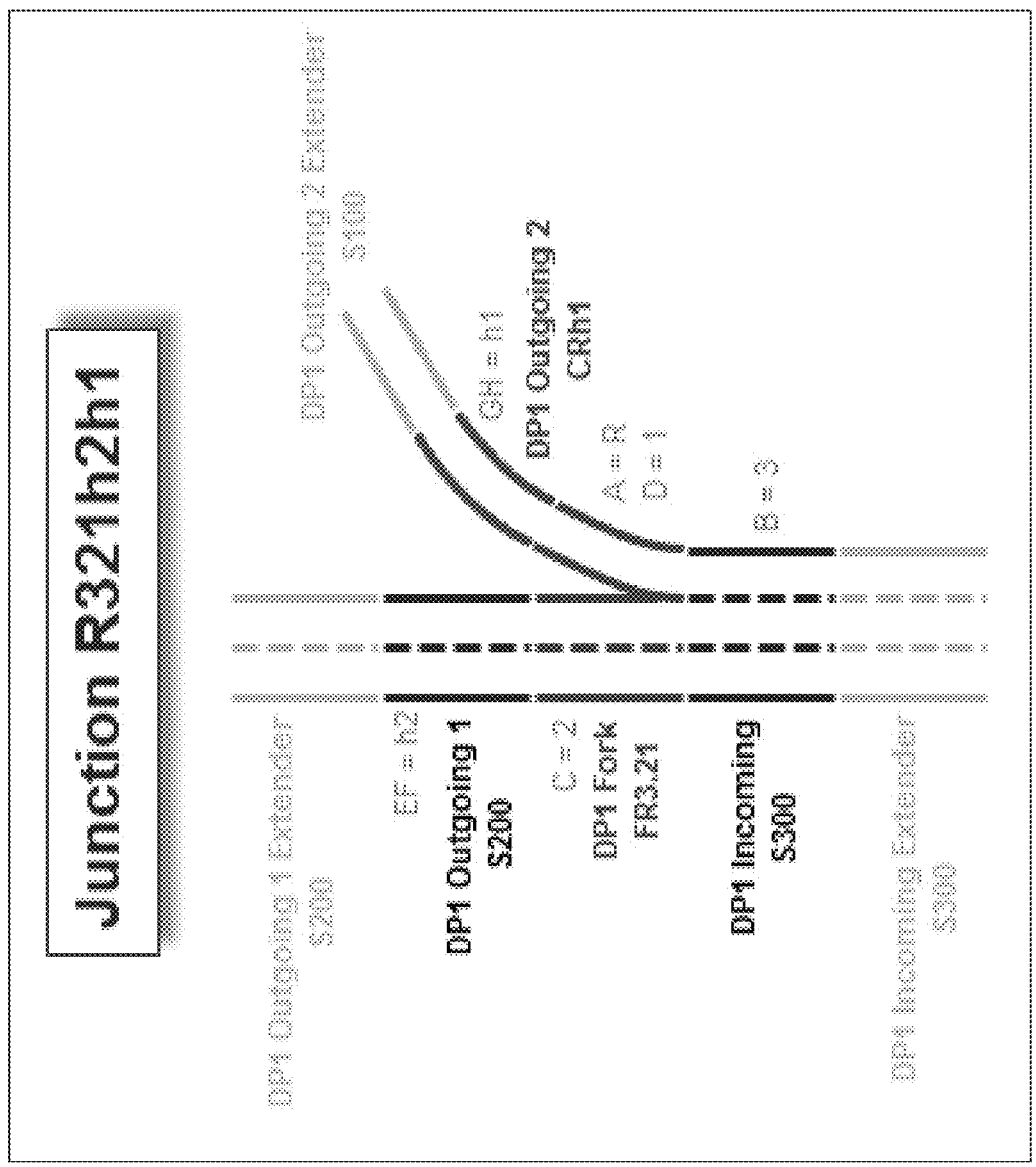
FIGS. 14A-14B illustrate an example of a componentized junction model according to an embodiment.
Figure 14B:
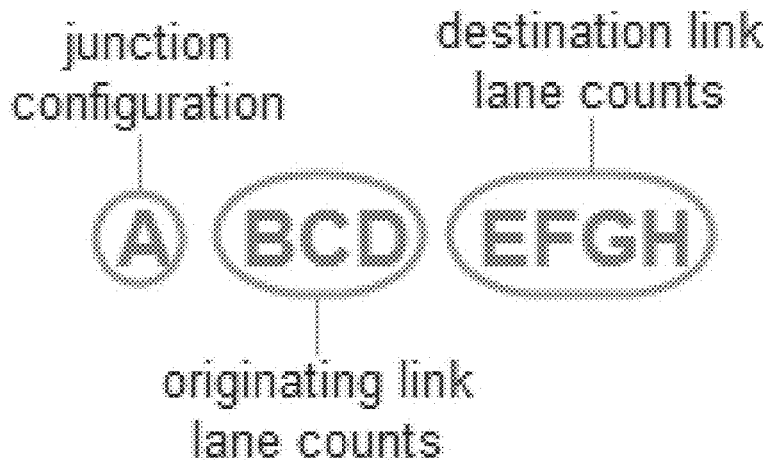
Figure 14B:
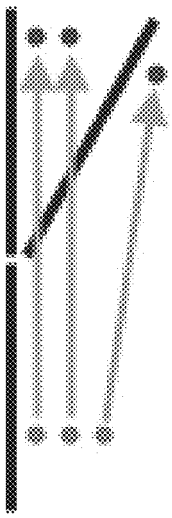
Figure 15A:
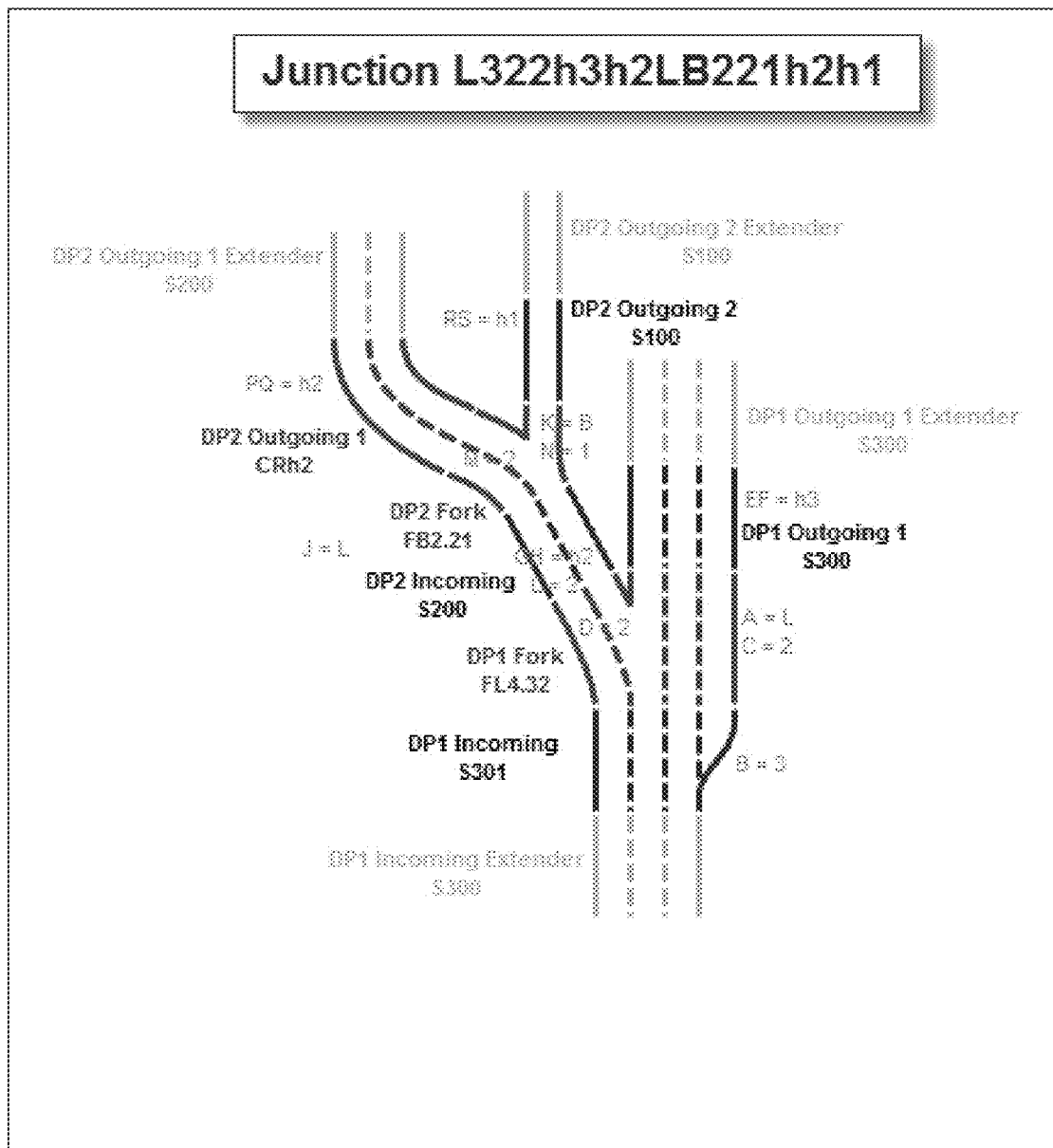
FIGS. 15A-15B illustrate another example of a componentized junction model according to an embodiment.
Figure 15B:
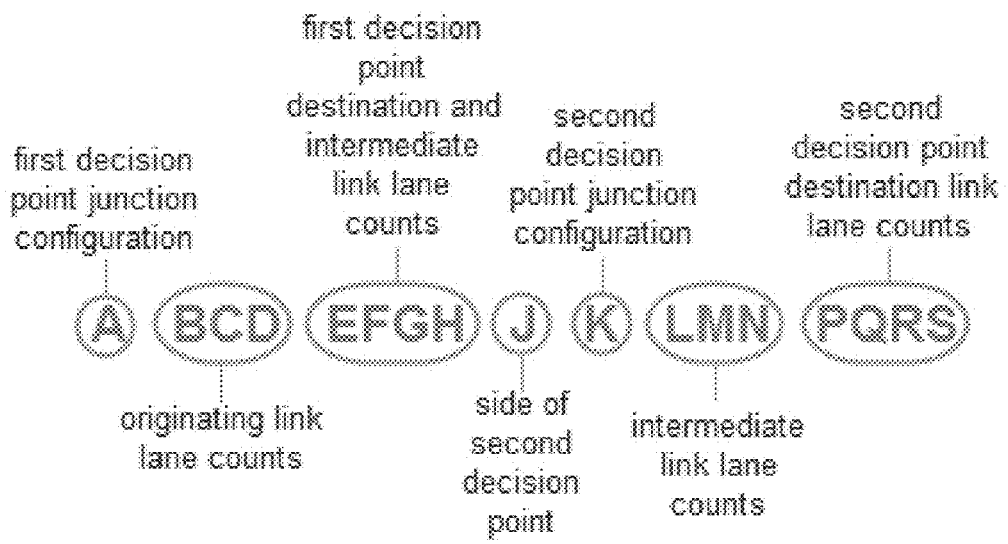
Figure 15B:
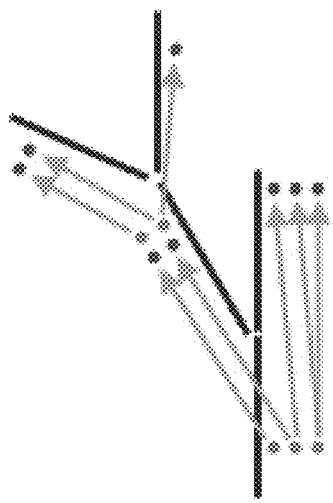
Figure 16A:
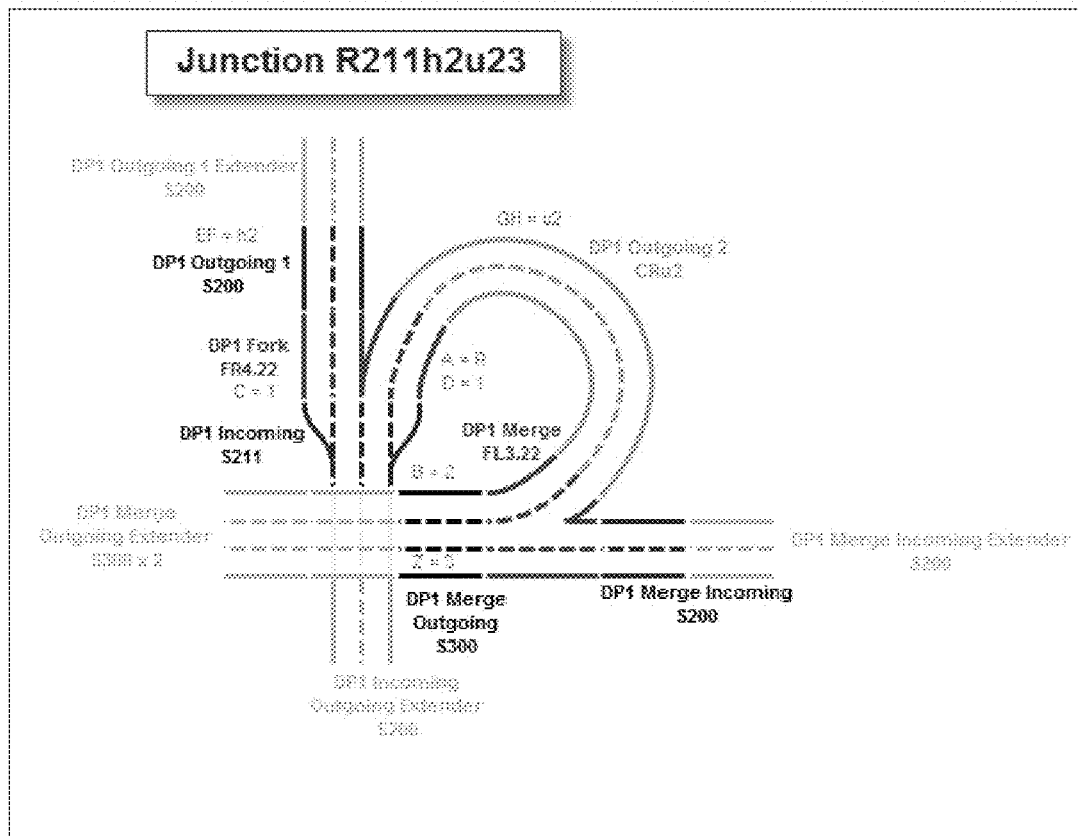
FIGS. 16A-16B illustrate another example of a componentized junction mode according to an embodiment.
Figure 16B:
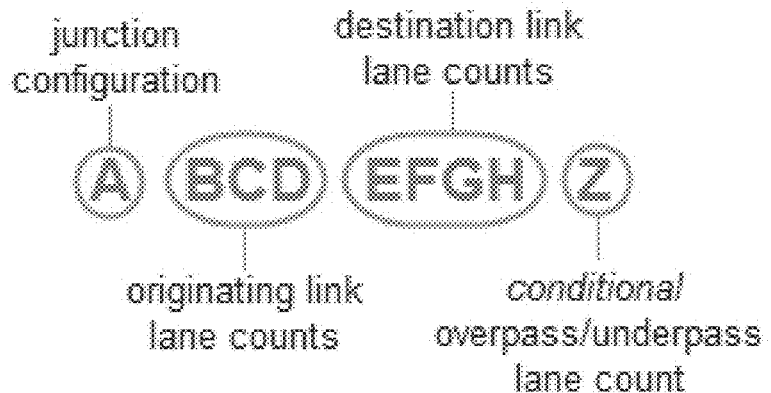
Figure 16B:
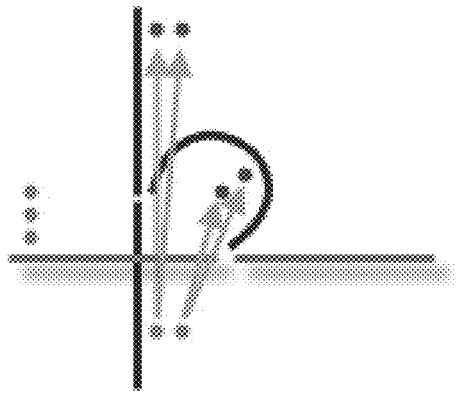
Figure 17A:
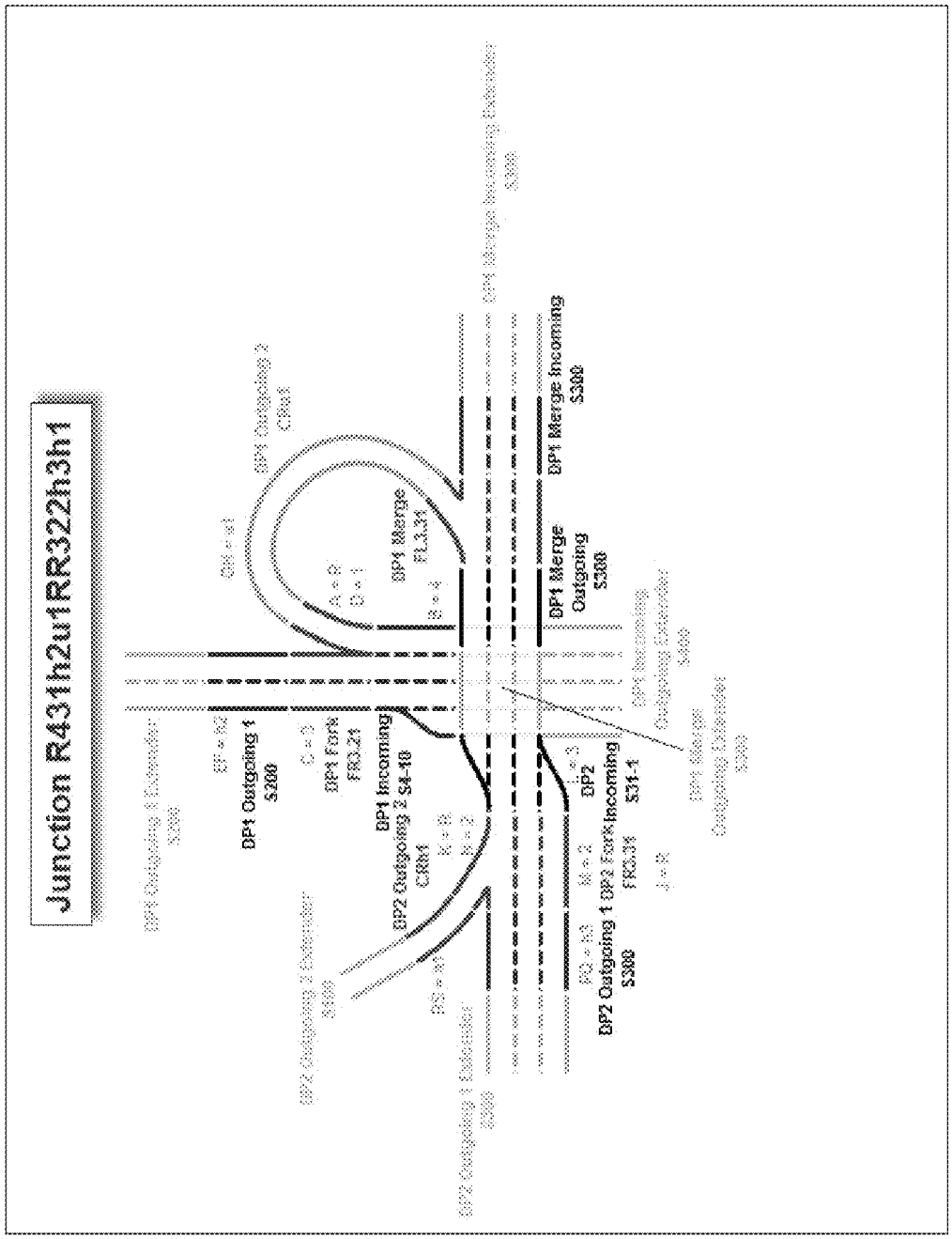
FIGS. 17A-17B illustrate another example of a componentized junction mode according to an embodiment.
Figure 17B:
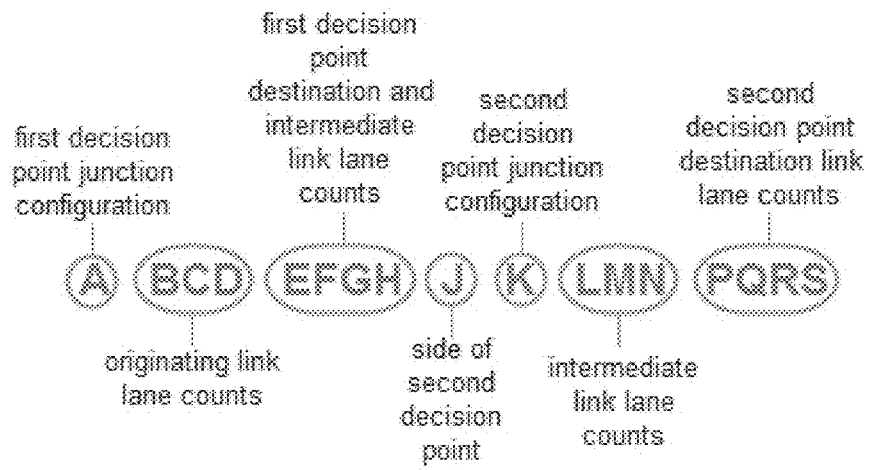
Figure 17B:
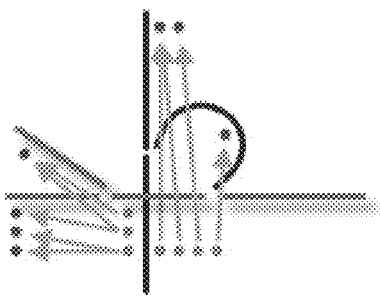
Figure 18A:
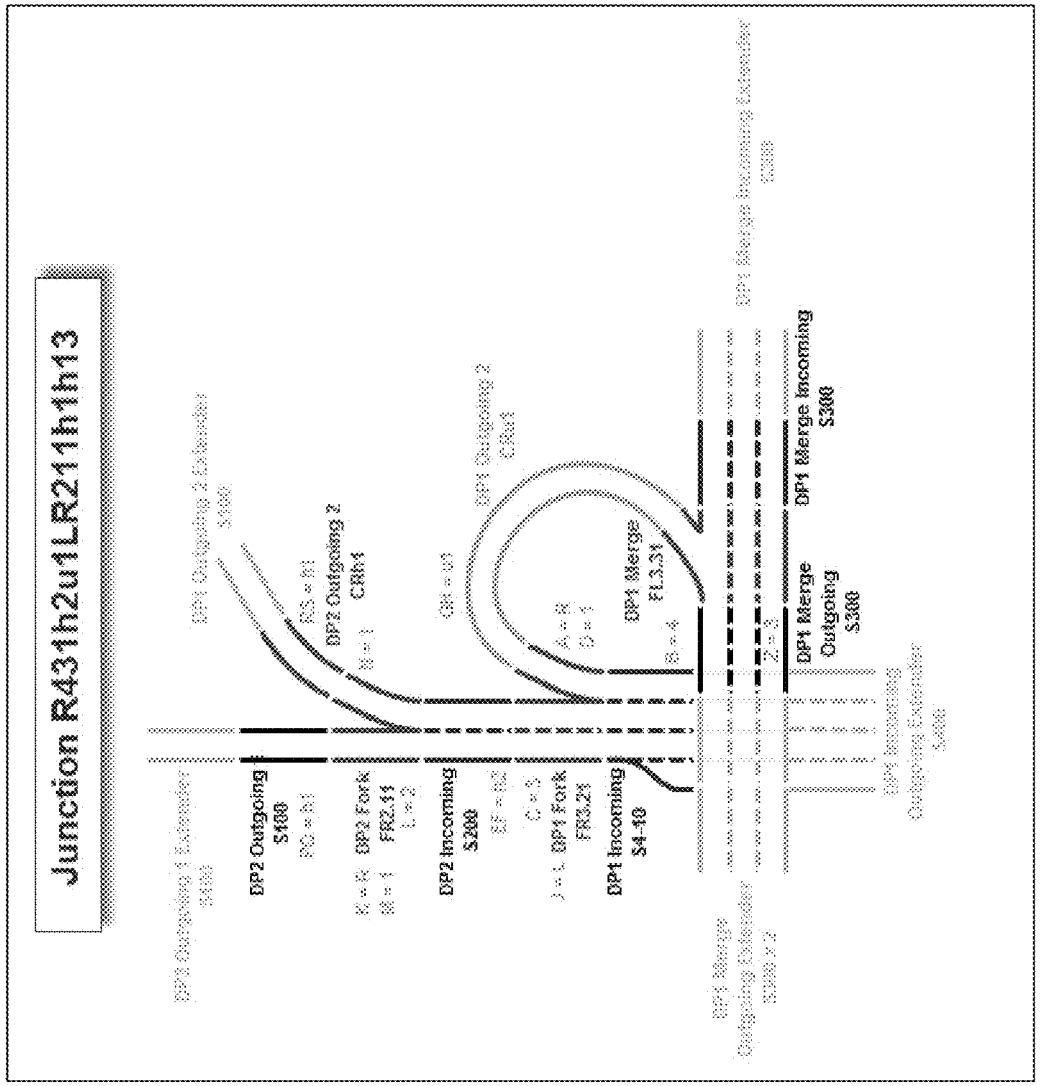
FIGS. 18A-18B illustrate another example of a componentized junction mode according to an embodiment.
Figure 18B:
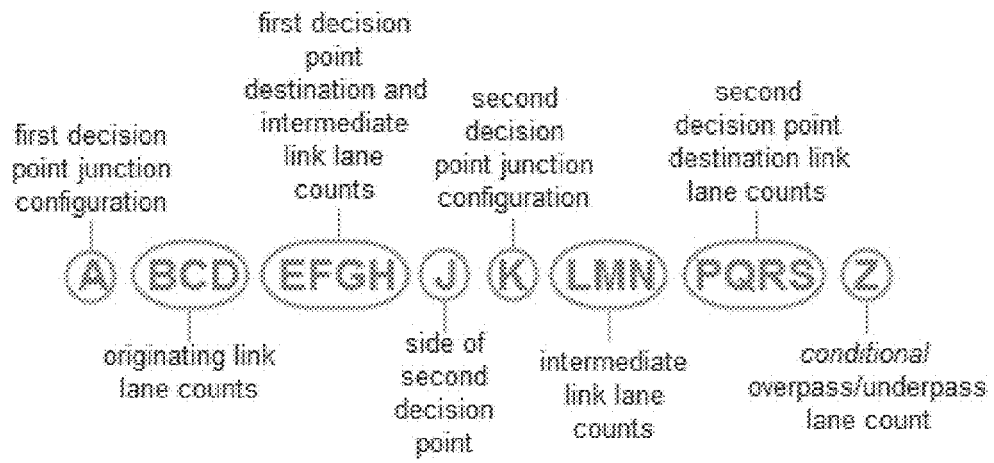
Figure 18B:
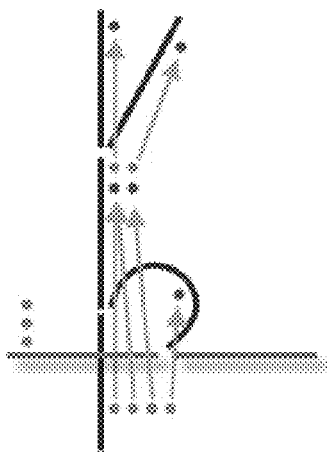

FIG. 13 illustrates a flowchart diagram of an embodiment of a method for constructing a componentized junction model using a look-aside table. The method is implemented by the system of FIG. 1, 22 (discussed below), 24 (discussed below) and/or a different system. Additional, different or fewer acts may be provided. The method is provided in the order shown. Other orders may be provided and/or acts may be repeated.

At act 101, a full or partial route through a physical road junction is calculated or received by a navigation system. At act 103, a junction template for a route through the physical road junction is identified. The identified junction template corresponds with the physical road junction. For example, the junction template is located in a look-aside table. The row located in the look-aside table includes a list of component models and other information used to generate a three-dimensional model of the physical road junction. At act 105, the junction template is looked up in the look-aside table to access information from the corresponding row (e.g., accessing a list of component models used to model the physical road junction). The component models are selected using construction rules that narrow down the possible component models to specific component model names. At act 107, a model of the physical road junction is generated by assembling the selected component models in the specific order provided by the look-aside table.

For example, FIGS. 14-18 depict various examples of generating physical road junction models using componentized junction models. FIGS. 14A-14B depict a model of a junction named R321h2h1. FIGS. 15A-15B depict a model of a junction named L322h3h2LB221h2h1. FIGS. 16A-16B depict a model of a junction named R211h2u23. FIGS. 17A-17B depict a model of a junction named R431h2u1RR322h3h1. FIGS. 18A-18B depict a model of a junction named R431h2u1LR211h1h13. As depicted in FIGS. 14-18, the junction template names, such as R321h2h1, completely and unambiguously identify the component models that must be used to construct a complete 3D junction model and how the component models all fit together to generate a road junction model. In these examples, the road junction shapes adhere to a set of pre-defined stylized patterns (e.g., using an algorithm or human judgment). Using the generalized component models, the road junction model may or may not realistically or closely match the shape of the physical road junction.

Figure 19:
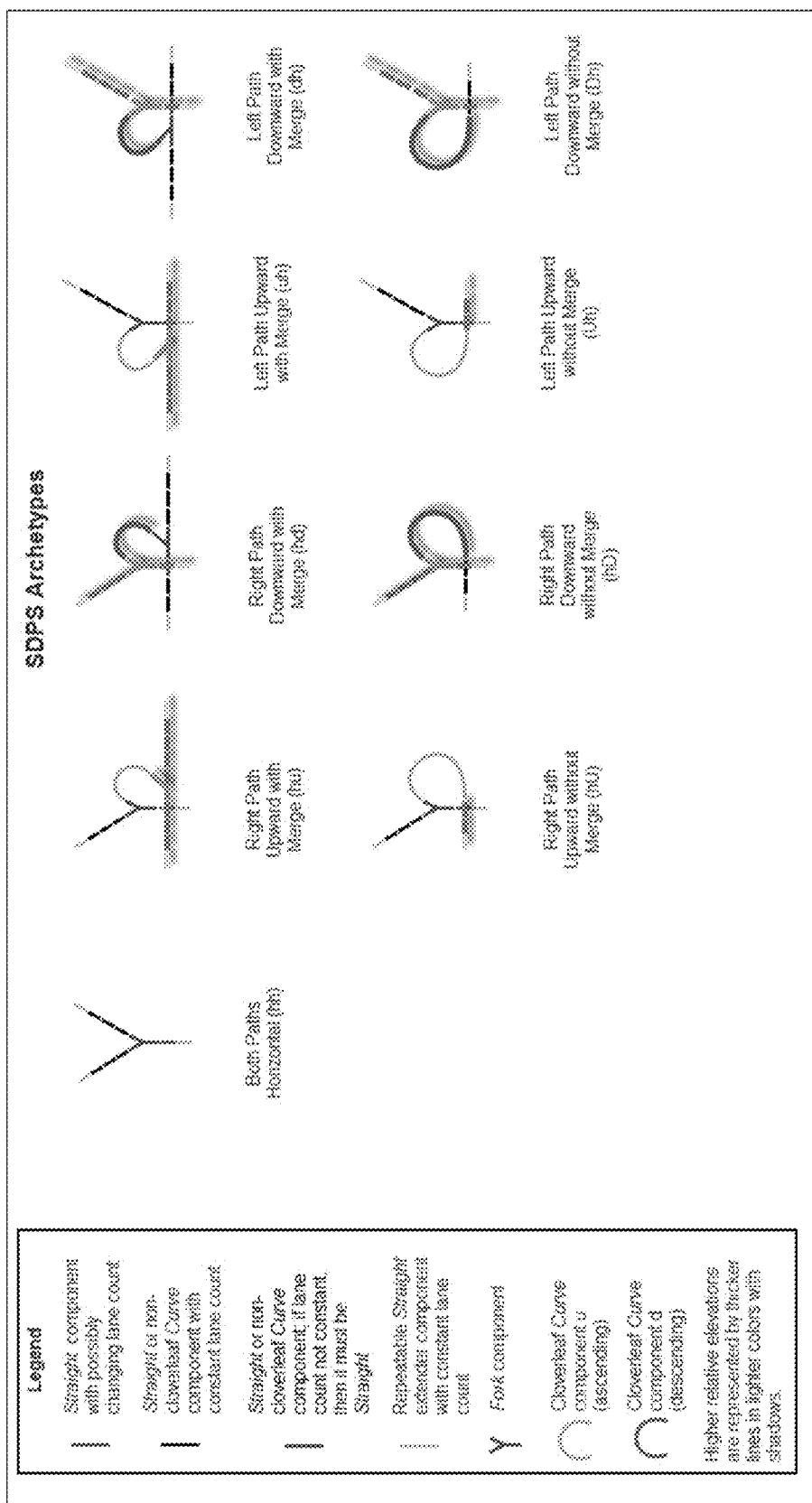
FIGS. 19-20 illustrate another example of a set of supported road junction archetypes according to an embodiment.
Figure 20:
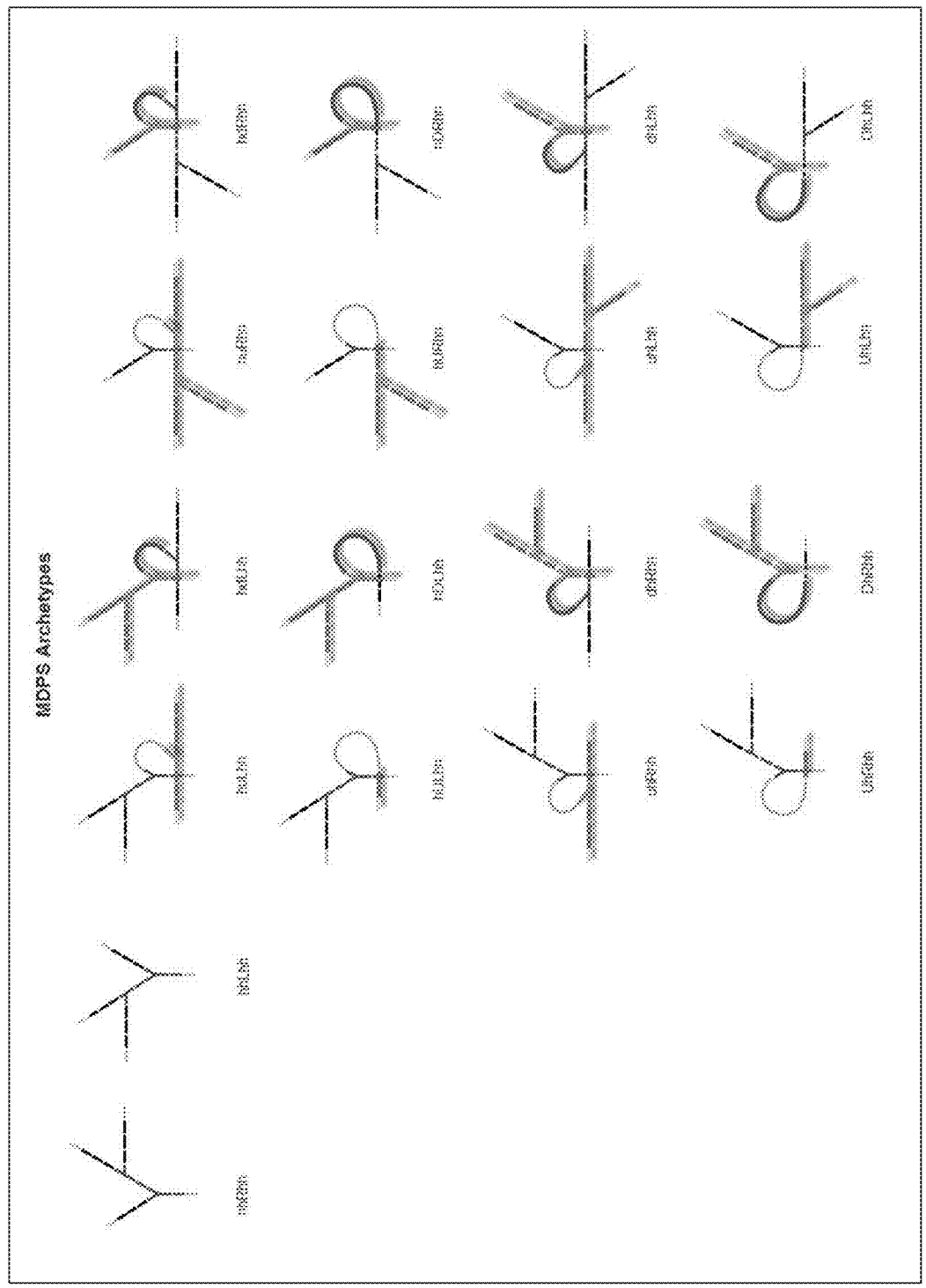

In other embodiments, a naming convention or other methodology for categorizing physical road junctions does not specify the specific component models to be used to construct the junction. In these embodiments, the model is constructed using conditional logic. For example, FIGS. 19-20 illustrate another example of a set of supported road junction archetypes. In this example, the component models may be arranged in many positions defined by an existing junction template by using variable component models of one of multiple different shapes (e.g., various exit angles, curve angles, etc.). There are nearly an infinite number of ways each component model may vary, therefore the junction model generated may more closely match the real world geometry of the physical road junction. Using a variable component models, a complete junction definition specifies each variant at every position in the road junction. For example, a naming convention as described above may be modified by adding additional information regarding the variable component models. Additional information is appended to the end of the existing junction template names. In this example, the naming convention and junction modeling may be simplified by removing the distinction in fork geometry to reflect a generalized and variable fork component models (i.e., right exits, left exits and bifurcations may no longer be distinguished). In this example, all forks are considered bifurcations, but by varying the shapes of the components used, junction models can still represent right exits and left exits with even greater accuracy.

In this example, the naming convention for the component models include two additional variables for each path. For example, for each component model, the naming convention includes a two digit angle variable. For a curved component model, a left curve is identified by "L"<turn angle> (e.g., "L15" is a left curve at 15 degrees) and a right curve is identified by "R"<turn angle> (e.g., "R20" is a right curve at 20 degrees). For each fork component model, the fork is identified by "F"<angle of left path>.<angle of right path> (e.g., "F0.25" is a right exit at 25 degrees). In cases where a variable is unused, the variable is set to "_" (underscore) as a placeholder for the variable (e.g., because the components of the naming convention are positional). Further, to more accurately model a road junction, extenders are used to accurately model the path leading to and away from decision points. For example, one or more extenders are used to model a distance before and after a decision point. For example, a threshold number of extenders (e.g., two extenders before and after each decision point) or a threshold distance (e.g., 250 meters before and after each decision point) may be used.

Thus, a syntax or naming convention for constructing the 3D model of the physical road junction may be used including the additional variables for the component models. For example, to construct single decision point situations, the following naming convention may be used: BCD EFG Z/d/efg/hij/stu/v/wxy; where BCD represents the originating link lane counts, EFGH represents the destination link lane counts, Z represents the conditional overpass/underpass lane count, d represents the first decision point fork type, efg represent the first decision point destination path type, hij represent the first decision point destination path type, stu represent the conditional first decision point incoming path type, v represents the conditional first decision point merge type, and wxy represents the conditional first decision point destination merge type. Using this example of a junction naming convention, following rules may be applied to model a physical road junction. For example, variables B, C, D, F, H, and Z remain unchanged as discussed above and variable A is no longer used. For road junctions that do not include an overpass or underpass, variables s, t, u, v, w, x, and y are omitted (e.g., may be represented as "_"). Variables E and G may support cloverleaf ramps that do not lead to merges. B is the number of originating lanes leading to the decision point, C is the number of originating lanes leading to the left path, and D is the number of originating lanes leading to the right path. E is the type of the left destination path, with "h" for a normal horizontal road, "u" for ascending (up) cloverleaf ramp that leads to a merge, "d" for descending (down) cloverleaf ramp that leads to a merge, "U" for ascending (up) cloverleaf ramp that does not lead to a merge, and "D" for descending (down) cloverleaf ramp that does not lead to a merge. F is the number of destination lanes in the left path. G is the type of the right destination path, with "h" for a normal horizontal road, "u" for ascending (up) cloverleaf ramp that leads to a merge, "d" for descending (down) cloverleaf ramp that leads to a merge, "U" for ascending (up) cloverleaf ramp that does not lead to a merge, and "D" for descending (down) cloverleaf ramp that does not lead to a merge. H is the number of destination lanes in the right path. Z is the number of overpass or underpass lanes (e.g., only present if E or G is "u" or "d") allowing the lane count of the road crossing over or under to differ from the lane count of the cloverleaf ramp destination path.

To define the specific shape of the junction model, d defines the fork angles of the decision point (e.g., "F"<angle of left path>.<angle of right path>), e defines the destination link from the left path of the decision point (e.g., straight or curved), f defines the first extender from the destination link of the left path of the decision point (e.g., straight or curved), and g defines the second extender from the destination link of the left path of the decision point (e.g., straight or curved). Further, h defines the destination link from the right path of the decision point (e.g., straight or curved), i defines the first extender from the destination link of the right path of the decision point (e.g., straight or curved), and j defines the second extender from the destination link of the right path of the decision point (e.g., straight or curved). Additionally, s defines the originating link to the merge point (e.g., straight or curved), t defines the first extender from the originating link to the merge point (e.g., straight or curved), and u defines the second extender from the originating link to the merge point (e.g., straight or curved). Finally, v defines the fork angles of the merge point (e.g., "F"<angle of left path>.<angle of right path>), w defines the destination link from the merge point (e.g., straight or curved), x defines the first extender from the destination link from the merge point (e.g., straight or curved), and y defines the second extender from the destination link from the merge point (e.g., straight or curved).

To construct multiple decision point situations, the following naming convention may be used: BCD EFGH J LMN PQRS Z/d/efg/hij/kl/mno/pqr/stu/v/wxy; where BCD represents the originating link lane counts, EFGH represents the first decision point destination link lane counts, J represents the side of the second decision point, LMN represent the intermediate link lane counts, PQRS represent the second decision point lane counts, Z represents the conditional overpass/underpass lane count, d represents the first decision point fork type, efg represent the first decision point destination path type, hij represent the first decision point destination path type, kl represent the second decision point incoming link and second decision fork type, mno represent the second decision point destination path type, pqr represent the second decision point destination path type, stu represent the conditional first decision point incoming path type, v represents the conditional first decision point merge type, and wxy represent the conditional first decision point destination merge type. Similarly, variables B, C, D, E, F, G, H, J, L, M, N, P, Q, R, S, and Z remain unchanged as discussed above and variable A and K are no longer used. For road junctions that do not include an overpass or underpass, variables s, t, u, v, w, x, and y are omitted (e.g., may be represented as "_"). Variables E and G may support cloverleaf ramps that do not lead to merges.

Further, to define the specific shape of the junction model, in addition to d/efg/hij/stu/v/wxy as discussed above, k defines the intermediate link to the second decision point (e.g., straight or curve, and straight if the lane count is not constant), l defines the fork angles of the second decision point (e.g., "F"<angle of left path>.<angle of right path>), m defines the destination link from the left path of the second decision point (e.g., straight or curved), n defines the first extender from the destination link of the second decision point (e.g., straight or curved), o defines the second extender from the destination link of the second decision point (e.g., straight or curved), p defines the destination link from the right path of the second decision point (e.g., straight or curved), q defines the first extender from the destination link of the right path of the decision point (e.g., straight or curved), and r defines the second extender from the destination link of the right path of the decision point (e.g., straight or curved).

In an embodiment, the incoming path to the first decision point may continue to be represented solely by straight components to simplify pre-maneuver lane change guidance and to simplify the transition between pre-maneuver guidance and the guidance provided through the road junction.

Further, the components connecting to forks may also be represented solely by straight components. In this example, restricting these component models to straight components may greatly limit the total number of component models necessary to accurately model a physical road junction.

Thus, to generate a 3D model of the physical junction, component models are assembled. With variable component models (e.g., addition of degrees of freedom, such as variable angles and lane counts), the component model naming convention from above is modified. For example, straight component models are provided as discussed above, but more complex models may be generated using curve models that may add or remove lanes and turn at any angle, and fork models that are variable with respect to the angle of each branch relative to the starting direction. For example, straight component models may adhere to the following convention: SXYZ; where "X" represents the number of lanes at the near end (in the driving direction) of the component model, "Y" represents the change in number of lanes on the left side between the near and far ends of the component model (e.g., positive when adding lanes and negative when removing lanes), and "Z" represents the change in number of lanes on the right side between the near and far ends of the component model (e.g., positive when adding lanes and negative when removing lanes). Further, curve component models may adhere to the following convention: CUV.W.X; where "U" represents the direction the curve bends (e.g., "L" if the curve bends toward the left or "R" if it bends toward the right), "V" represents the curve type (e.g., "h" for a normal horizontal road, "u" for ascending (up) cloverleaf ramp, or "d" for descending (down) cloverleaf ramp), "W" represents the turn angle (e.g., positive integral degrees in the direction of curvature defined by U; the angle between the normal vectors of the Start and End accessors), and "X" represents the number of lanes in the component model. Finally, fork component models may adhere to the following convention: FA.B.C.DE; where "A" represents the angle of the left path (e.g., positive integral degrees, with positive being in the direction away from the right path; the angle between the normal vectors of the start and left end accessors), "B" represents the angle of the right path (e.g., positive integral degrees, with positive being in the direction away from the left path; the angle between the normal vectors of the start and right end accessors), "C" represents the number of lanes at the near end of the component model (e.g., may be a one- or two-digit number, hence the need for the period), "D" represents the number of destination lanes in the left path, and "E" represents the number of destination lanes in the right path.

In various embodiments, the lane counts may not vary when components are assembled (e.g., component models may inherit the lane count of from part of the path closest to the nearest decision point). However, in other embodiments, lane counts may vary, and may result in a more complex junction template name and look-aside table. For example, in an embodiment, only the curve angle of a cloverleaf curve component model may vary. In this embodiment, the number of variations supported depends on the number and nature of the fork component variations (e.g., assuming overpasses and underpasses always cross the originating path perpendicularly). Further, to add more junction configurations, the road merging into a cloverleaf ramp on the approach to an overpass/underpass is now optional. This will require variations of cloverleaf ramps with more angular rotation so they can reach all the way around to the overpass/underpass path without first connecting to a Fork component at the merge.

Figure 21A:
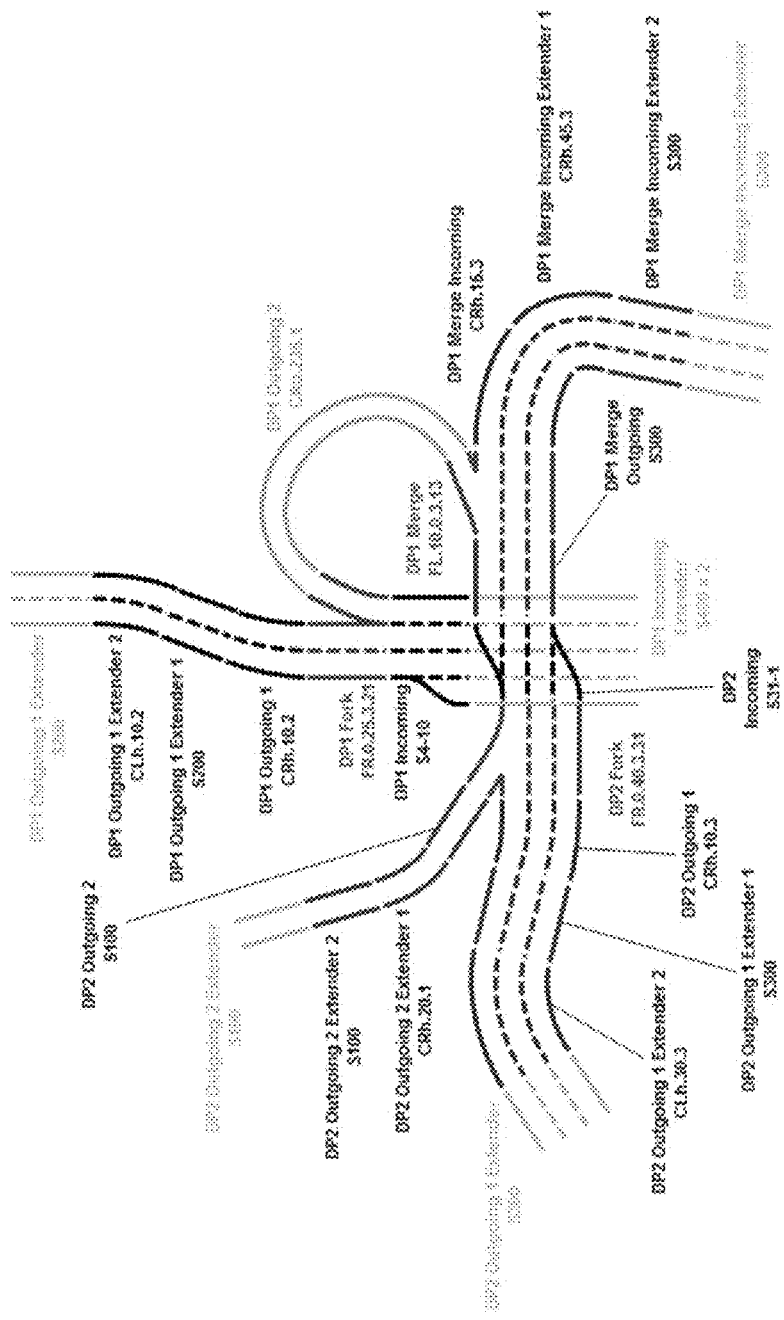
FIGS. 21A-21B illustrate an example of generating physical road junction models using componentized junction models with variable geometries according to an embodiment.
Figure 21B:
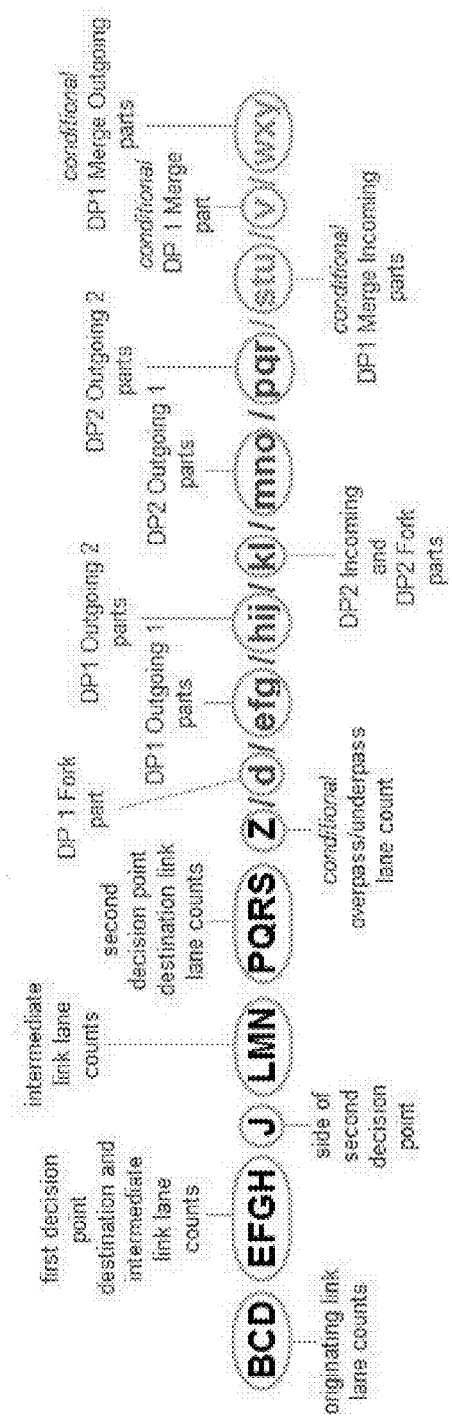

FIGS. 21A-21B depict an example of generating physical road junction models using componentized junction models with variable geometries. FIGS. 21A-21B depict a model of a junction named: 431h2u1R322h3h1/F0.25/R10SL10/R235_/SF0.40/R10SL30SR20S/R15R45S/F10.0/S_. Using the variable component models, the road junction model may realistically and closely match the shape of the physical road junction.

Figure 22:
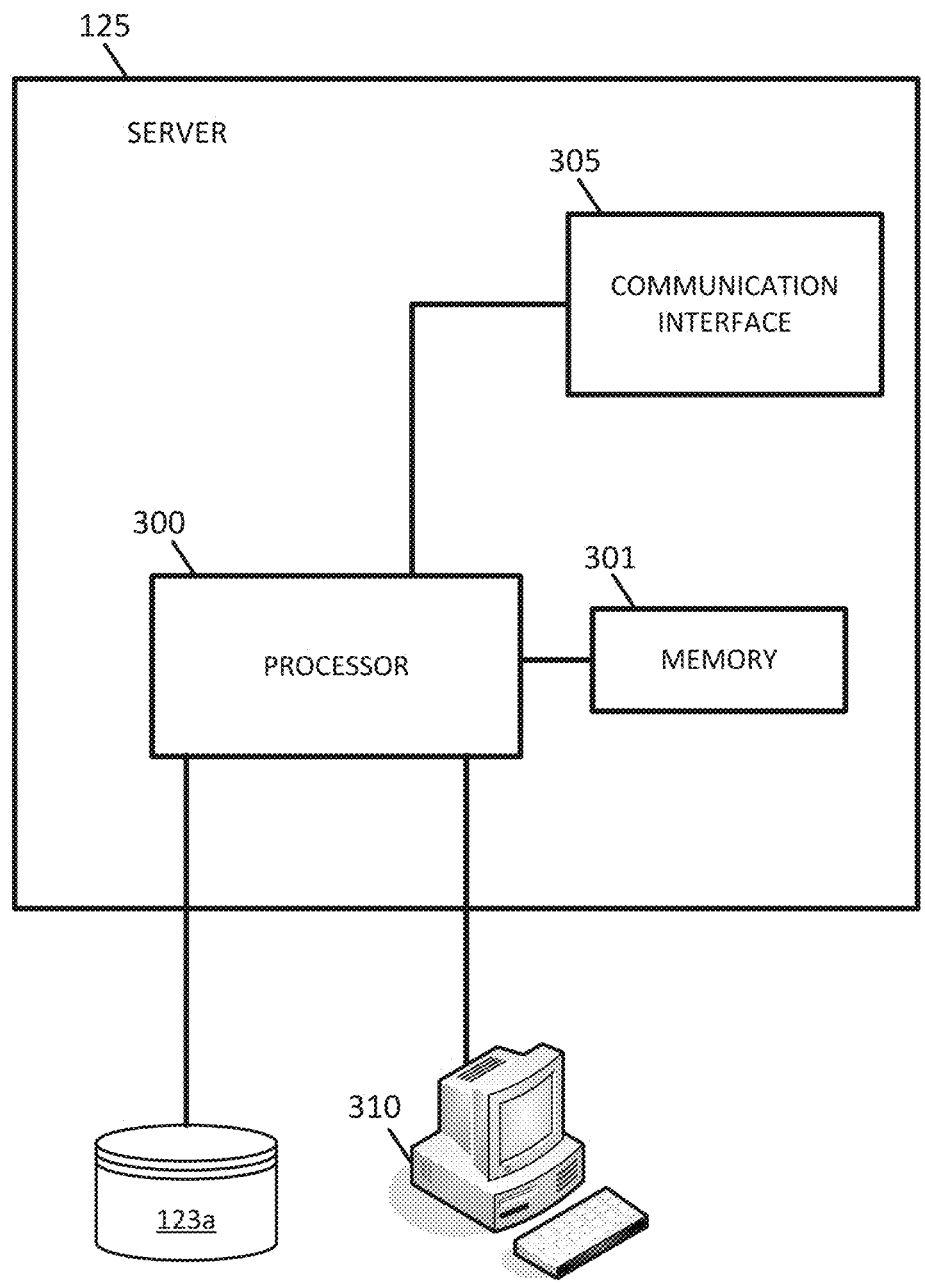
FIG. 22 illustrates an example server device according to an embodiment.

FIG. 22 illustrates an example server device according to an embodiment. The server 125 includes a processor 300, a communication interface 305, and a memory 301. Additional, different, or fewer components may be provided. The processor 300 may be any processor suitable for the execution of a computer program include, by way of example, both general and special purpose microprocessors, and one or more processors of any kind of digital computer. Generally, a processor receives instructions and data from a read only memory, a random access memory or both. The server 125 may be coupled to a database 123a and a workstation 310. Additional, different, or fewer components may be provided. The workstation 310 may be used by a user to access the server 125. The database 123a may store map or other geographic data, and information collected by mobile devices 122 (e.g., vehicle and environmental parameters).

Figure 23:
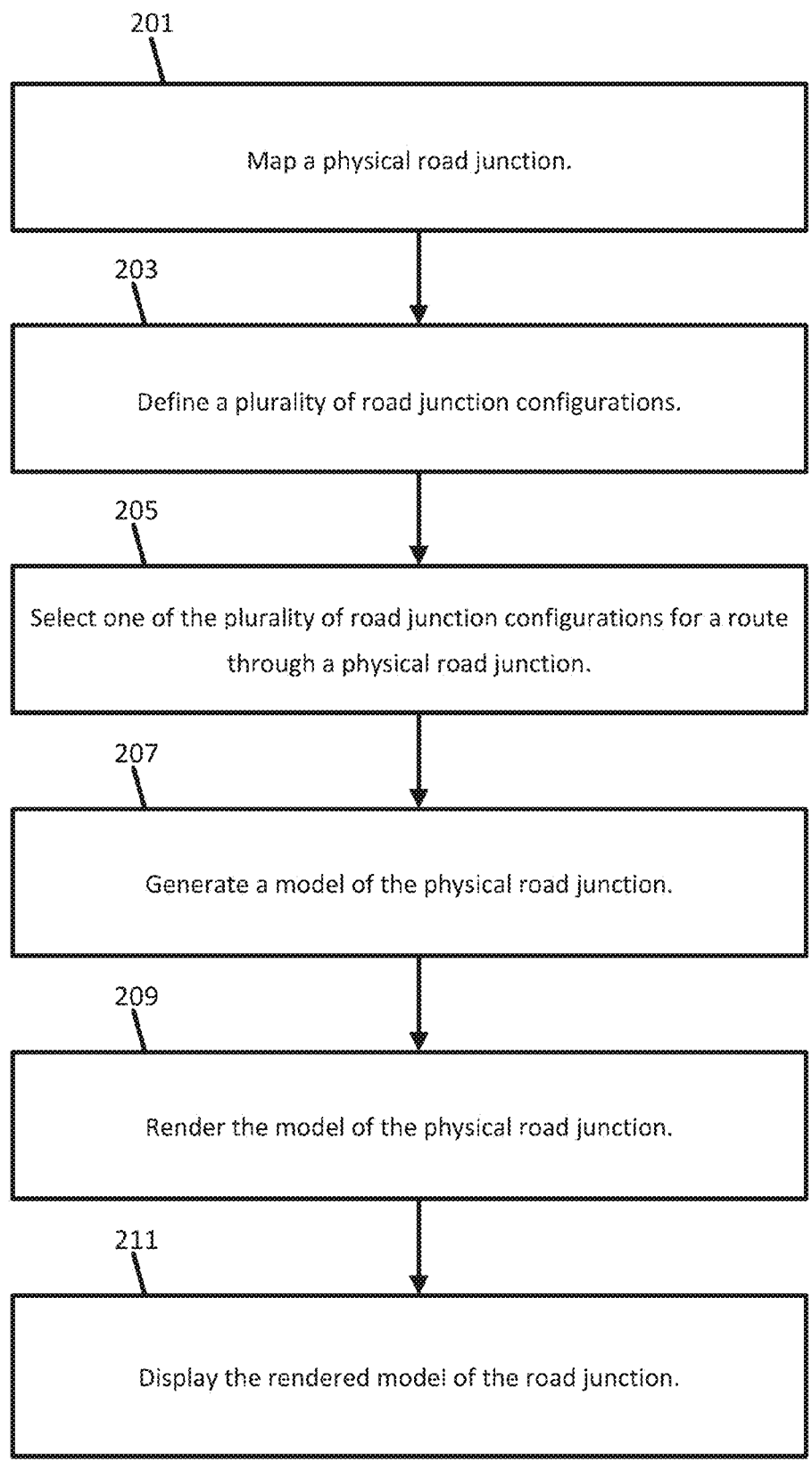
FIG. 23 illustrates an example flowchart for the server device of FIG. 20 according to an embodiment.

FIG. 23 illustrates an example flowchart for the server device of FIG. 22 according to an embodiment. Additional, different or fewer acts may be provided. The method is provided in the order shown. Other orders may be provided and acts may be repeated.

At act 201, the server 125 maps a plurality of physical road junction and stores the map data in a memory 301 or a database 123a. For example, the server 125 maps a physical road junction using an algorithm. Further, various routes through a physical road junction may be mapped separately. Alternatively, the server 125 maps a physical road junction based on information received from mobile devices 122. Further, a map of one or more physical road junctions may be received from another location, such as a third party provider of map data.

At act 203, the server 125 defines a plurality of road junction configurations and stores the configurations in a memory 301 or a database 123a. For example, a different set of road segment models correspond to and may be assembled for each of the plurality of road junction configurations. In an implementation, each of the plurality of road junction configurations defines either a single-decision junction or a double-decision junction. Further, each of the plurality of road junction configurations includes one or more of curved road segment models, fork road segment models and/or straight road segments. Each of the plurality of road segment models varies by shape, lane count or both. For example, straight road segment models may vary by a lane count that includes a first number of lanes entering the straight road segment model and a second number of lanes exiting the straight road segment model. Likewise, curved road segment models may vary by a curve direction including a right curve or a left curve, by a curve type including a horizontal curve, an ascending curve or a descending curve, and by a lane count. Further, fork road segment models may vary by a fork type including a left exit, a right exit or a bifurcation, and by a lane count including a first number of lanes entering the fork road segment model, a second number of lanes exiting the fork road segment model to the left and a third number of lanes exiting the fork road segment to the right. In another embodiment, the component models may also vary by curve angle, fork angle and lane angle. Further, extender component models may be provided leading to and leading away from other component models, such as forks, exits and other components.

At act 205, server 125 selects one of the plurality of road junction configurations for a route through the physical road junction. For example, a road junction configuration may be selected using the characteristics of the mapped physical road junction. At act 207, the server 125 generates a model of the physical road junction by assembling the set of road segment models corresponding to the selected road junction configuration. The generated model of the road junction may be a three-dimensional or two-dimensional model. At act 209, the server 125 renders the model of the physical road junction. For example, the rendered model of the road junction may be a static two-dimensional rendering or an animated three-dimensional rendering. At act 211, the server 125 or a mobile device 122 displays the rendered model of the road junction. For example, the model may be displayed along with driving directions or other instructions for navigating the route through physical road junction.

Figure 24:
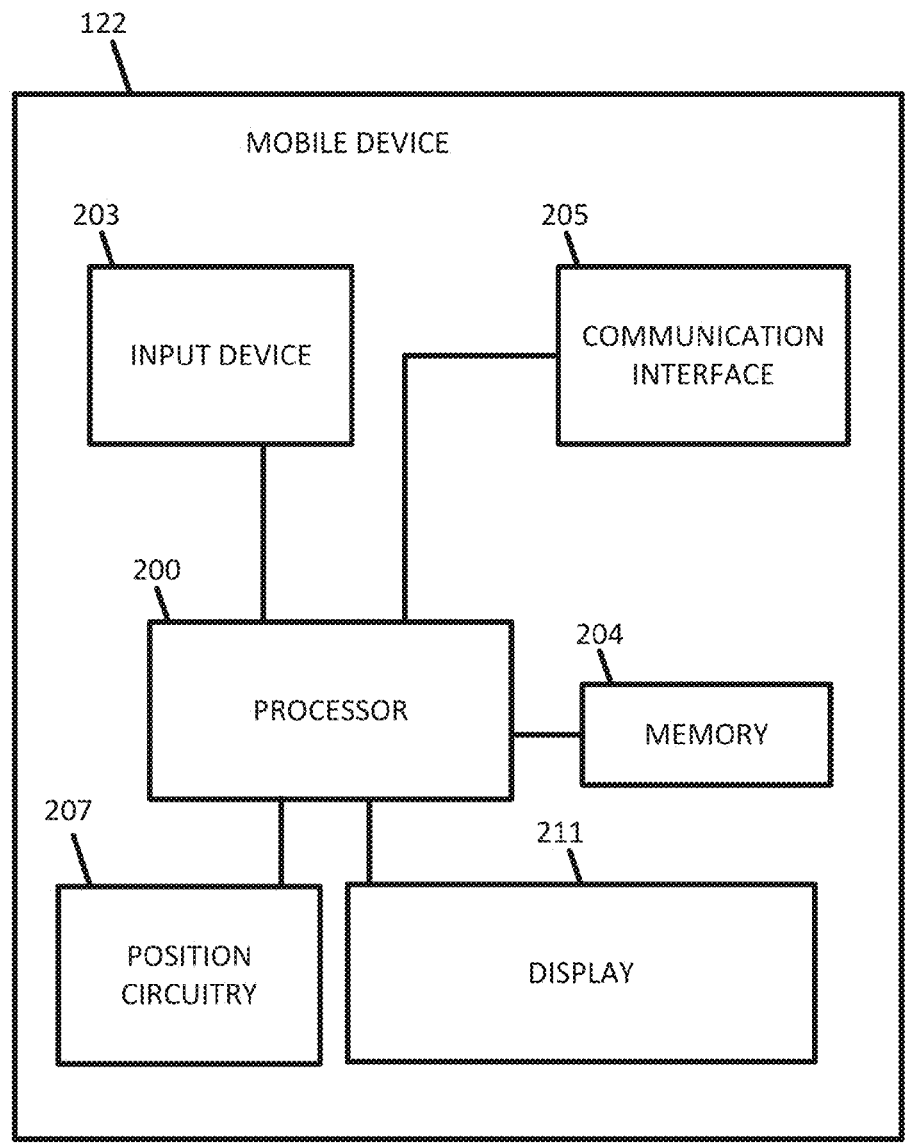
FIG. 24 illustrates an example mobile device according to an embodiment.

FIG. 24 illustrates an example mobile device according to an embodiment. The mobile device 122 includes a processor 200, a memory 204, an input device 203, a communication interface 205, position circuitry 207, and a display 211. Additional, different, or fewer components are possible for the mobile device 122.

The processor 200 may be any processor suitable for the execution of a computer program include, by way of example, both general and special purpose microprocessors, and anyone or more processors of any kind of digital computer. Generally, a processor receives instructions and data from a read only memory, a random access memory or both.

The positioning circuitry 207 may include a Global Positioning System (GPS), Global Navigation Satellite System (GLONASS), or a cellular or similar position sensor for providing location data. The positioning system may utilize GPS-type technology, a dead reckoning-type system, cellular location, or combinations of these or other systems. The positioning circuitry 207 may include suitable sensing devices that measure the traveling distance, speed, direction, and so on, of the mobile device 122. The positioning system may also include a receiver and correlation chip to obtain a GPS signal. Alternatively or additionally, the one or more detectors or sensors may include an accelerometer built or embedded into or within the interior of the mobile device 122. The accelerometer is operable to detect, recognize, or measure the rate of change of translational and/or rotational movement of the mobile device 122. The mobile device 122 receives location data from the positioning system. The location data indicates the location of the mobile device 122.

The input device 203 may be one or more buttons, keypad, keyboard, mouse, stylist pen, trackball, rocker switch, touch pad, voice recognition circuit, or other device or component for inputting data to the mobile device 100. The input device 203 and the display 211 may be combined as a touch screen, which may be capacitive or resistive. The display 211 may be a liquid crystal display (LCD) panel, light emitting diode (LED) screen, thin film transistor screen, or another type of display.

The controller 200 and/or processor 200 may include a general processor, digital signal processor, an application specific integrated circuit (ASIC), field programmable gate array (FPGA), analog circuit, digital circuit, combinations thereof, or other now known or later developed processor. The controller 200 and/or processor 200 may be a single device or combinations of devices, such as associated with a network, distributed processing, or cloud computing.

The memory 204 and/or memory 301 may be a volatile memory or a non-volatile memory. The memory 204 and/or memory 301 may include one or more of a read only memory (ROM), random access memory (RAM), a flash memory, an electronic erasable program read only memory (EEPROM), or other type of memory. The memory 204 and/or memory 301 may be removable from the mobile device 122, such as a secure digital (SD) memory card.

The communication interface 205 and/or communication interface 305 may include any operable connection. An operable connection may be one in which signals, physical communications, and/or logical communications may be sent and/or received. An operable connection may include a physical interface, an electrical interface, and/or a data interface. The communication interface 205 and/or communication interface 305 provides for wireless and/or wired communications in any now known or later developed format.

The mobile device 122 may be assisted driving vehicles. Assisted driving vehicles include autonomous vehicles, highly assisted driving (HAD), and advanced driving assistance systems (ADAS). Any of these assisted driving systems may be incorporated into mobile device 122. Alternatively, an assisted driving device may be included in the vehicle. The assisted driving device may include memory, a processor, and systems to communicate with the mobile device 122.

The term autonomous vehicle may refer to a self-driving or driverless mode in which no passengers are required to be on board to operate the vehicle. An autonomous vehicle may be referred to as a robot vehicle or an automated vehicle. The autonomous vehicle may include passengers, but no driver is necessary. These autonomous vehicles may park themselves or move cargo between locations without a human operator. Autonomous vehicles may include multiple modes and transition between the modes. The autonomous vehicle may steer, brake, or accelerate the vehicle based on the merge notification.

A highly assisted driving (HAD) vehicle may refer to a vehicle that does not completely replace the human operator. Instead, in a highly assisted driving mode, the vehicle may perform some driving functions and the human operator may perform some driving functions. Vehicles may also be driven in a manual mode in which the human operator exercises a degree of control over the movement of the vehicle. The vehicles may also include a completely driverless mode. Other levels of automation are possible. The HAD vehicle may control the vehicle through steering or braking in response to the merge notification.

Similarly, ADAS vehicles include one or more partially automated systems in which the vehicle alerts the driver. The features are designed to avoid collisions automatically. Features may include adaptive cruise control, automate braking, or steering adjustments to keep the driver in the correct lane. ADAS vehicles may issue controls for these feature in response to merge notification.

Driving assistance may be provided based on the junction model and an array of sensors that may include any combination of a brake sensor, a steering sensor, an environment sensor, a vehicle sensor, an optical sensor, and an inertial sensor. Additional, different, or fewer sensors may be used.

The brake sensor may be a brake pedal sensor that detects displacement of the brake pedal of the vehicle. The brake sensor may detect the actuation of the brake pads near the wheel of the vehicle. The brake sensor may be a circuit that detects operation of the brakes through an anti-lock brake system. The steering sensor may be a steering wheel sensor that detects movement of the steering wheel of the vehicle. The steering sensor may detect the angle of the steering wheel. The steering sensor may detect the angle of the front wheel of the vehicle. The environment sensor may detect the environment of the vehicle. The environment sensor may include a weather sensor such as a thermometer, barometer, or a rain sensor. The rain sensor may detect the movement of windshield wipers. The vehicle sensor may detect an operation of the vehicle. The vehicle sensor may include a throttle sensor that measures a position of a throttle of the engine or a position of an accelerator pedal, a speedometer sensor, or a tachometer sensor. The vehicle sensor may detect a malfunction of the vehicle. For example, the vehicle sensor may be a tire pressure sensor. The optical sensor may include a camera, a LiDAR device, a proximity sensor, or another sensor configured to detect distances to nearby objects or when a nearby object exists. The optical sensor may send a signal that reflects off another object and is detected by the optical sensor. The inertial sensor may include an inertial measurement unit (IMU) including one or more of an accelerometer, a gyroscope, and a magnetic sensor. The inertial sensor may generate data indicative of the acceleration, deceleration, rotational acceleration, and rotation deceleration experienced by the vehicle.

Figure 25:
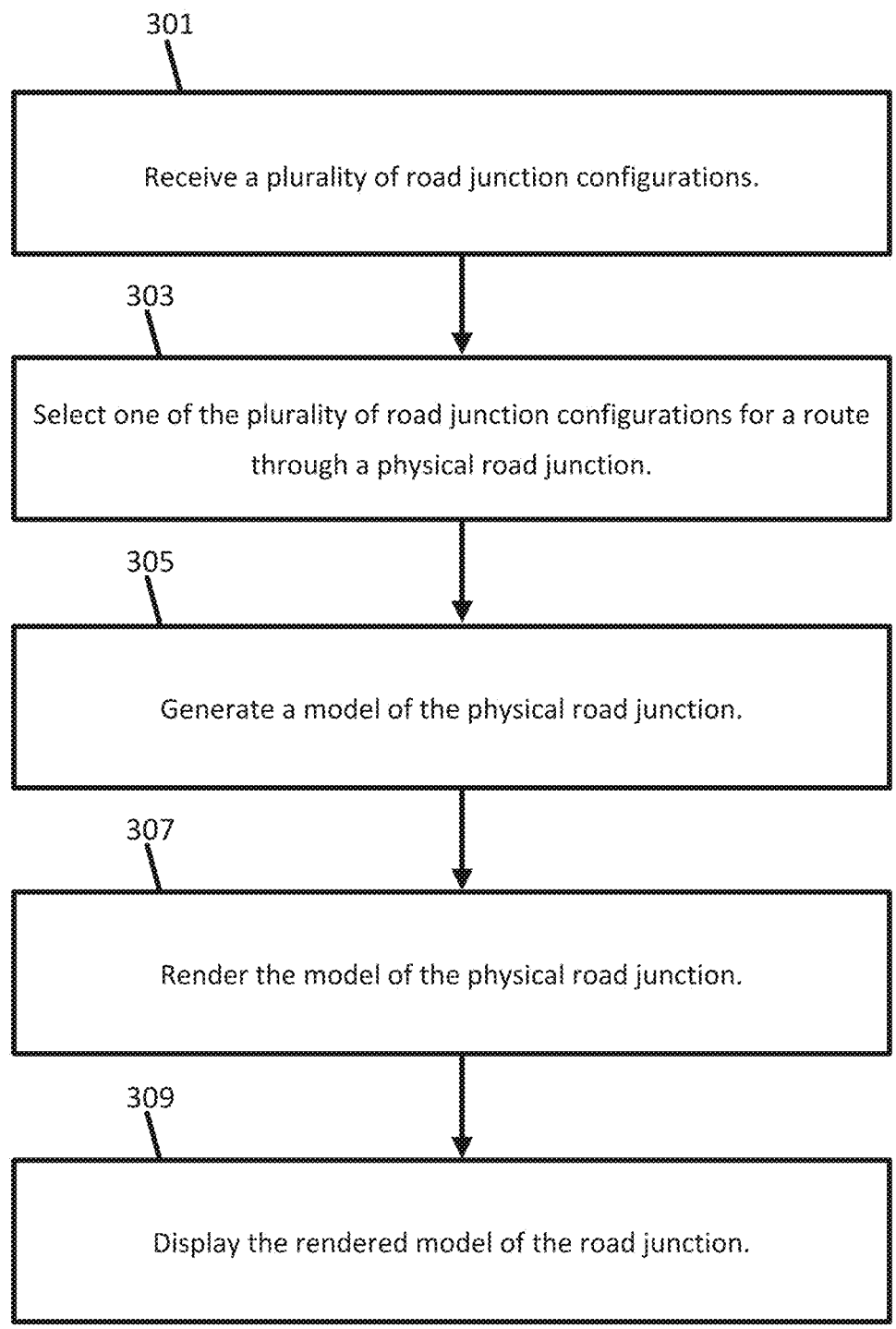
FIG. 25 illustrates an example flowchart for the mobile device of FIG. 22 according to an embodiment.

FIG. 25 illustrates an example flowchart for the mobile device of FIG. 24 according to an embodiment. Additional, different or fewer acts may be provided. The method is provided in the order shown. Other orders may be provided and steps may be repeated.

At act 301, the mobile device 122 receives a plurality of characteristics of a road junction. At act 303, the mobile device 122 selects a set of road segment models corresponding to the characteristics of the road junction along the desired route. For example, each of the each of road segment models varies by shape, lane count or both. At act 305, the mobile device 122 generates a three-dimensional model of the road junction by assembling the set of road segment models. At act 307, the mobile device 122 renders the three-dimensional model of the physical road junction. At act 309, the mobile device 122 displays the rendered model of the road junction.

Referring back to FIG. 1, map databases, such as geographic databases 123a and 123b, are used in computer-based systems that provide useful features to users. For example, map databases are used for the identification of routes to destinations or points of interest. A navigation system determines the optimum route to be taken by the end user to travel from the origin to the destination location from map data stored in a geographic (or map) database. Map databases are also used in advanced driver assistance systems, such as curve warning systems, adaptive cruise control systems and headlight aiming systems. Map databases are also used in systems that improve vehicle fuel economy, such as systems that optimize transmission gear selection taking into account upcoming slope and speed changes.

As shown in FIG. 1, a master copy of the geographic database 123a may be stored at the server 125, and a local copy of the geographic database 123b may be stored at the mobile device 122. In one example, the local copy of the database 123b is a full copy of the geographic database, and in another example, the local copy of the database 123b may be a cached or partial portion of the geographic database. The cached portion may be defined based on a geographic location of the mobile device 122 or a user selection made at the mobile device 122. The geographic databases 123a and 123b may be a geographic database including road links or segments. Additional, different, or fewer components may be provided.

The geographic databases 123a and 123b may store or maintain geographic data such as, for example, road segment or link data records and node data records. The geographic databases 123a and 123b may also store or maintain one or more look-aside tables (LAT). The link data records are links or segments representing the roads, streets, or paths. The node data records are end points (e.g., intersections) corresponding to the respective links or segments of the road segment data records. The road link data records and the node data records may represent, for example, road networks used by vehicles, cars, and/or other entities.

Each road segment may be associated with two nodes (e.g., one node represents the point at one end of the road segment and the other node represents the point at the other end of the road segment). The node at either end of a road segment may correspond to a location at which the road meets another road, i.e., an intersection, or where the road dead-ends. Each road segment may be associated with zero or more shape points. Shape points are an ordered sequence of vertices that indicate the shape of the road as a polyline between the nodes. The road shape may also be represented by an analytical curve such as a B-spline, Bezier curve, Clothoid curve or other curve types. The road segments may include sidewalks and crosswalks for travel by pedestrians.

Each of the road segments or links may be associated with various attributes or features stored in lists that are not byte aligned. The road segment data record may include data that indicate a speed limit or speed category (i.e., the maximum permitted vehicular speed of travel) on the represented road segment. The road segment data record may also include data that indicate a classification such as a rank of a road segment that may correspond to its functional class. The road segment data may include a segment ID by which the data record can be identified in the geographic database 123. The road segment data, nodes, segment IDs, attributes, fields, and other data may be organized in data structures described above.

The road segment data may include data identifying what turn restrictions exist at each of the nodes which correspond to intersections at the ends of the road portion represented by the road segment, the name or names by which the represented road segment is known, the length of the road segment, the grade of the road segment, the street address ranges along the represented road segment, the permitted direction of vehicular travel on the represented road segment, whether the represented road segment is part of a controlled access road (such as an expressway), a ramp to a controlled access road, a bridge, a tunnel, a toll road, a ferry, and so on. The additional road segment data may be organized in data tree structures. Alternatively, the data tree structures may be included in a separate database, for example, internal to the server 125 and/or the mobile device 122, or at an external location.

The server 125 may send map updates to the mobile device 122. The server 125 may update a particular tile of the geographic database 123. The server 125 may send updates to the master copy of the geographic database 123a and/or send updates to the local copy of the geographic database 123b. The server 125 may generate an update script or patch file for the navigation data and transmit the update script or patch file to the mobile device 122 to update the local copy of the database 123b.

The mobile device 122 may be a personal navigation device ("PND"), a portable navigation device smart phone, a mobile phone, a personal digital assistant ("PDA"), a tablet computer, a notebook computer, and/or any other known or later developed mobile device or personal computer. The mobile device 122 may also be an automobile head unit, infotainment system, and/or any other known or later developed automotive navigation system. Non-limiting embodiments of navigation devices may also include relational database service devices, mobile phone devices, car navigation devices, and navigation devices used for air or water travel.

The mobile device 122 may be configured to execute routing algorithms to determine an optimum route to travel along a road network from an origin location to a destination location in a geographic region. Using input from the end user, the mobile device 122 examines potential routes between the origin location and the destination location to determine the optimum route. The mobile device 122 may then provide the end user with information about the optimum route in the form of guidance that identifies the maneuvers required to be taken by the end user to travel from the origin to the destination location. Some mobile devices show detailed maps on displays outlining the route, the types of maneuvers to be taken at various locations along the route, locations of certain types of features, and so on.

The computing resources may be divided between the server 125 and the mobile device 122. In some embodiments, the server 125 performs a majority of the processing. In other embodiments, the mobile device 122 performs a majority of the processing. In addition, the processing may be divided substantially evenly between the server 125 and the mobile device 122.

The map developer system in server 125 and the mobile device 122 are coupled with the network 127. The phrase "coupled with" is defined to mean directly connected to or indirectly connected through one or more intermediate components. Such intermediate components may include hardware and/or software-based components. Many mobile devices 122 may connect with the network 127.

The network 127 may include wired networks, wireless networks, or combinations thereof. The wireless network may be a cellular telephone network, an 802.11, 802.16, 802.20, or WiMax network. Further, the network 127 may be a public network, such as the Internet, a private network, such as an intranet, or combinations thereof, and may utilize a variety of networking protocols now available or later developed including, but not limited to TCP/IP based networking protocols.

The term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored. These examples may be collectively referred to as a non-transitory computer readable medium.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

As used in this application, the term 'circuitry' or 'circuit' refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

Processors suitable for the execution of a computer program include, by way of example, both general and special purpose microprocessors, and anyone or more processors of any kind of digital computer. Generally, a processor receives instructions and data from a read only memory or a random access memory or both. The essential elements of a computer are a processor for performing instructions and one or more memory devices for storing instructions and data. Generally, a computer also includes, or is operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a device having a display, e.g., a CRT (cathode ray tube) or LCD (liquid crystal display) monitor, or projector, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

We claim:

1. A method comprising:
defining a plurality of road junction configurations, wherein each road junction configuration specifies a different set of road segment models, each road segment model representing a short road segment;
selecting one of the plurality of the defined road junction configurations for a route through a physical road junction, wherein the selected road junction configuration is a closest fitting road junction configuration to the physical road junction;
generating a model of the physical road junction by assembling the set of road segment models specified by the selected road junction configuration; and
generating a rendering of the model of the physical road junction for display to a user.

2. The method of claim 1, wherein selecting one of the plurality of defined road junction configurations is based on characteristics of the physical road junction mapped by an algorithm to determine the closest fitting road junction configuration to the physical road junction.

3. The method of claim 1, wherein each of the plurality of road segment models varies by shape, lane count or both.

4. The method of claim 1, wherein each of the plurality of road segment models comprises one of a plurality of straight road segment models, one of a plurality of curved road segment models, or one of a plurality of fork road segment models.

5. The method of claim 4, wherein the straight road segment models vary by a lane count comprising a first number of lanes entering the straight road segment model and a second number of lanes exiting the straight road segment model.

6. The method of claim 4, wherein the curved road segment models vary by a curve direction comprising a right curve or a left curve, by a curve type comprising a horizontal curve, an ascending curve or a descending curve, and by a lane count.

7. The method of claim 4, wherein the fork road segment models vary by a fork type comprising a left exit, a right exit or a bifurcation, and by a lane count comprising a first number of lanes entering the fork road segment model, a second number of lanes exiting the fork road segment model to the left and a third number of lanes exiting the fork road segment to the right.

8. The method of claim 1, wherein the model of the road junction is a three-dimensional model.

9. The method of claim 1, further comprising:
displaying the rendered model of the road junction.

10. The method of claim 1, wherein the rendered model of the road junction is a static two-dimensional rendering or an animated three-dimensional rendering.

11. The method of claim 1, wherein the physical road junction is mapped using an algorithm to select the road junction configuration that is the closest fit from the plurality of road junction configurations.

12. The method of claim 1, wherein each of the plurality of road junction configurations comprises a single-decision junction or a double-decision junction.

13. The method of claim 12, wherein each of the plurality of predefined road segment models comprises one of a plurality of straight road segment models, one of a plurality of curved road segment models, or one of a plurality of fork road segment models.

14. The method of claim 13, wherein the curved road segment models vary by a curve direction comprising a right curve or a left curve, by a curve type comprising a horizontal curve, an ascending curve or a descending curve, by a curve angle, and by a lane count.

15. The method of claim 13, wherein the fork road segment models vary by a fork angle for a left path, a fork angle for a right path, and by a lane count comprising a first number of lanes entering the fork road segment model, a second number of lanes exiting the left path and a third number of lanes exiting right path.

16. The method of claim 13, wherein the straight road segment models vary by a lane count comprising a first number of lanes entering the straight road segment model and a second number of lanes exiting the straight road segment model.

17. An apparatus comprising:
at least one processor; and
at least one memory including non-transitory computer program code for one or more programs;
the at least one memory and the computer program code configured to, with the at least one processor, cause the apparatus to at least perform:
receiving a plurality of road junction configurations supported by a navigation system, wherein each of the plurality of road junction configurations correspond to a different set of predefined road segment models, each predefined road segment model representing a short road segment interconnectable with other road segment models;
selecting one of the plurality of road junction configurations for a route through a physical road junction, wherein the selected road junction configuration is a closest fitting road junction configuration to the physical road junction selected from the plurality road junction configurations supported by a navigation system;

generating a three-dimensional model of the physical road junction using the corresponding set of predefined road segment models of the selected road junction configuration;

rendering the three-dimensional model of the physical road junction, and displaying the rendered three-dimensional model of the physical road junction with driving instructions through the physical road junction.

18. A non-transitory computer readable medium including instructions that when executed are operable to:

receive a plurality of characteristics of a physical road junction, the characteristics comprising road shape and lane count of the physical road junction;

select a set of predefined road segment models from a plurality of interconnectable predefined road segment models representing short road segments, each road segment model of the set of the interconnectable predefined road segment models varies by shape, lane count or both, the selected set of predefined road segment models corresponding to the characteristics of the physical road junction;

generate a model of the physical road junction by assembling the set of predefined road segment models, the set of predefined road segment models assembled in a specific order to model a route through the road junction;

render the model of the road junction; and provide the rendered model of the physical road junction for display on a mobile device.

19. The non-transitory computer readable medium of claim 18, wherein the set of predefined road segment models is selected based on the characteristics of the physical road junction mapped by an algorithm to determine closest fitting road segment models to the physical road junction.

20. The non-transitory computer readable medium of claim 18, wherein the non-transitory computer readable medium includes instructions to:

display, by the mobile device, the rendered model of the physical road junction.

* * * * *